United States Patent [19]
Okamoto et al.

[11] Patent Number: 5,475,084
[45] Date of Patent: Dec. 12, 1995

[54] PROCESS FOR THE PRODUCTION OF POLYCARBONATE POWDER

[75] Inventors: Masaya Okamoto; Noriyuki Kunishi, both of Ichihara, Japan

[73] Assignee: Idemitsu Petrochemical Co., Ltd., Tokyo, Japan

[21] Appl. No.: 327,027

[22] Filed: May 3, 1994

[51] Int. Cl.$^6$ ................................ C08F 6/00
[52] U.S. Cl. ............... 528/502 E; 528/190; 528/196; 528/500; 34/368; 34/371
[58] Field of Search ............................. 528/500, 502, 528/196; 34/10, 368

[56] References Cited

U.S. PATENT DOCUMENTS

| | | | |
|---|---|---|---|
| 3,508,339 | 4/1970 | Neblett | 34/368 |
| 4,074,864 | 2/1978 | Narita et al. | 241/23 |
| 4,206,161 | 6/1980 | Sato et al. | 264/11 |
| 4,209,912 | 7/1980 | Barker | 34/10 |
| 4,212,967 | 7/1980 | Govoni et al. | 528/196 |
| 4,546,172 | 10/1985 | Kohyama et al. | 528/491 |

FOREIGN PATENT DOCUMENTS

| | | |
|---|---|---|
| 56-29890 | 7/1981 | Japan. |
| 63-1333 | 1/1988 | Japan. |
| 2-6561 | 2/1990 | Japan. |
| 1071486 | 6/1967 | United Kingdom. |
| WO87/04637 | 8/1987 | WIPO. |

Primary Examiner—James J. Seidleck
Assistant Examiner—Terressa M. Mosley
Attorney, Agent, or Firm—Frishauf, Holtz, Goodman, Langer & Chick

[57] ABSTRACT

A process for the production of a polycarbonate powder comprising introducing an organic solvent solution of polycarbonate and steam into a mixing nozzle and obtaining the polycarbonate powder from a mixture ejected from the mixing nozzle, wherein the organic solvent solution contains 3 to 45% by weight of the polycarbonate, and the ratio of the weight of steam/the weight of an organic solvent in the organic solvent solution is $1/10$ to $1/3$.

30 Claims, 5 Drawing Sheets

PROCESS FOR THE PRODUCTION OF POLYCARBONATE POWDER

This application is a continuation application of International application PCT/JP92/01193.

TECHNICAL FIELD

The present invention relates to a process for the production off a polycarbonate powder, and particularly to a process for the production or a polycarbonate powder having a high bulk density.

TECHNICAL BACKGROUND

The process for the production of a polycarbonate includes a melt polycondensation method (transesterification method) and an interfacial polycondensation method (phosgene method), and the interfacial polycondensation method is industrially preferably employed.

In the process for the production of a polycarbonate based on the interfacial polycondensation method, an emulsion obtained by an interfacial polycondensation reaction is subjected to washing and separation procedures to obtain an organic solvent solution of a polycarbonate (the solvent is generally methylene chloride). Then, the polycarbonate is isolated (recovered) as a powder or particles from the obtained organic solvent solution. Thereafter, the so-obtained polycarbonate is molded in the form of pellets or the like as required.

As a simple method for recovering a polycarbonate as a powder from an organic solvent solution, there is known a method in which the organic solvent solution and steam are introduced into an ejector nozzle (mixing nozzle), the mixture ejected from the ejector nozzle is introduced through a tubing into a separator, and a polycarbonate powder is recovered with the separator (JP-B-63-1333, JP-B-2-6561 and U.S. Pat. No. 3,508,339). For recovering the polycarbonate powder by the above method, the ratio ($W_S/W_O$) of the weight of the steam ($W_S$) and the weight of the organic solvent ($W_O$) in the organic solvent solution of the polycarbonate is set to be greater than 1/5, and the steam and the organic solvent solution are introduced into the mixing nozzle.

The above method has an advantage in that a polycarbonate having a less residual solvent content can be facilely recovered in the form of powder as compared with a method in which a poor solvent is added to an organic solvent solution of a polycarbonate (JP-B-42-14474), a kneader-applied pulverization method taking advantage of the crystallization of an organic solvent solution of a polycarbonate (JP-B-53-15899) or a method in which an organic solvent solution of a polycarbonate is poured into hot water (Japanese Patent Application No. 60-115625).

However, in the conventional method in which an organic solvent solution of a polycarbonate is introduced into a mixing nozzle and the polycarbonate is recovered in the form of a powder from a mixture ejected from the mixing nozzle, the obtained polycarbonate has the form of waste thread, and the bulk density thereof is as low as 0.05 to 0.35. Therefore, the volume efficiency of a treating apparatus used for the post treatment for drying or storage of the obtained polycarbonate powder is low. There is hence a problem in that a treating apparatus having a large size is required or that the production adjustment is required to meet the volume of the treating apparatus. Further, a polycarbonate powder having a low bulk density is poor in the mixability with other additives, and dense pellets cannot be obtained when this powder is pelletized.

It is an object of the present invention to provide a process for the production of a polycarbonate powder having a high bulk density, which can facilely give a polycarbonate powder having a high bulk density and having a less residual solvent content.

DISCLOSURE OF THE INVENTION

The process of the present invention, which achieves the above object, includes the following processes I to IV.

I. In a process for the production of a polycarbonate powder having a high bulk density, comprising introducing an organic solvent solution of a polycarbonate and steam into a mixing nozzle and recovering the polycarbonate as a powder from a mixture ejected from the mixing nozzle, the process using, as the organic solvent solution, an organic solvent solution containing 3 to 45% by weight of the polycarbonate, and employing a ratio of 1/10 to 1/5 as the ratio of the weight of steam/the weight of an organic solvent in the organic solvent solution (this process is referred to as Process I hereinafter).

II. A process for the production of a polycarbonate powder having a high bulk density, which comprises introducing an organic solvent solution having a polycarbonate concentration of 3 to 45% by weight and steam in an amount of 1/20 to 1/8 of the weight of an organic solvent in the organic solvent solution, into a mixing nozzle; mixing a mixture ejected from the mixing nozzle with steam in an amount of 1/200 to 1/1 of the weight of the organic solvent in the organic solvent solution, after a residence time of 0.001 to 1 second, to obtain a second mixture; and recovering a polycarbonate as a powder from the second mixture (this process is referred to as Process II hereinafter).

III. A process for the production of a polycarbonate having a high bulk density which comprises introducing an organic solvent solution having a polycarbonate concentration of 3 to 45% by weight, steam and a polycarbonate powder into a mixing nozzle; and recovering a polycarbonate as a powder from a mixture ejected from the mixing nozzle (this process is referred to as Process III hereinafter).

IV. A process for the production of a polycarbonate having a high bulk density, which comprises introducing an organic solvent solution having a polycarbonate concentration of 3 to 45% by weight and steam into a mixing nozzle; introducing a mixture ejected from the mixing nozzle, into a mixer directly from the mixing nozzle or through a tubing; introducing a mixture outletted from the mixer into a gas-solid separator through a tubing; and recovering a polycarbonate from the gas-solid separator (this process is referred to as Process IV hereinafter).

PREFERRED EMBODIMENTS FOR WORKING THE INVENTION

Figure 1:
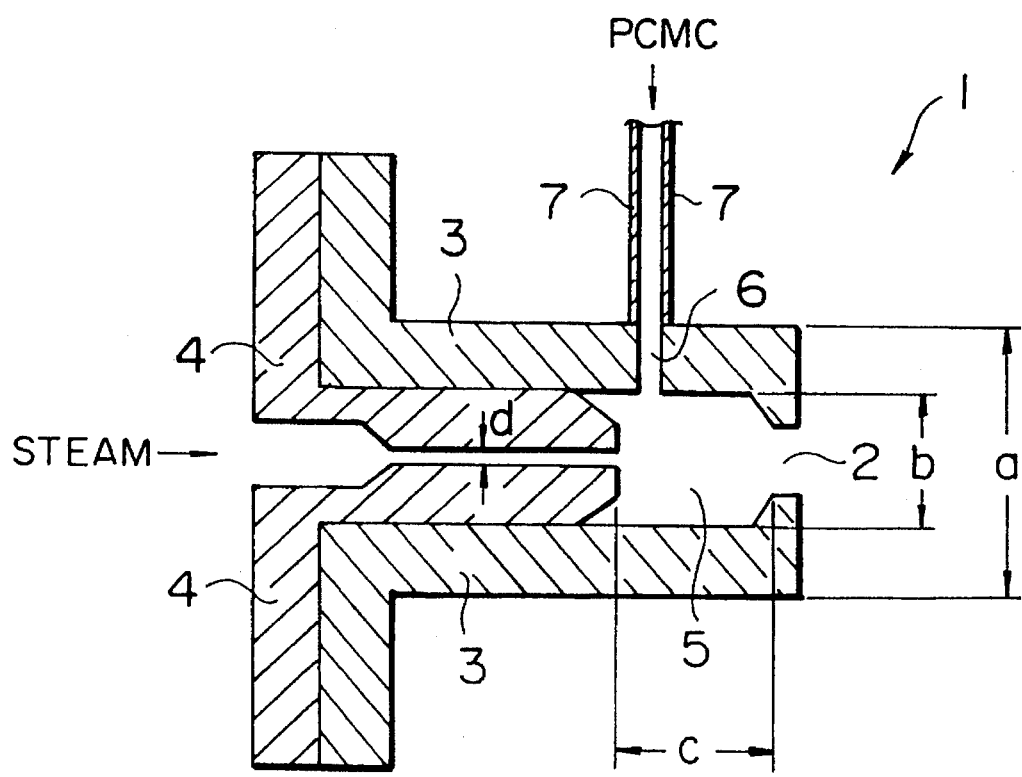
FIG. 1 is a cross-sectional view of a mixing nozzle used in Examples 1 to 5.

Each of the Processes I to IV of the present invention will be detailed hereinafter.

Process I

The polycarbonate concentration in an organic solvent solution of a polycarbonate (to be sometimes simply referred to as organic solvent solution hereinafter) is 3 to 45% by weight (to be abbreviated as wt % hereinafter) as described above. The reason for the restriction of the polycarbonate concentration to 3 to 45 wt % is that when it is less than 3 wt %, the productivity of a polycarbonate powder is too low and that when it exceeds 45 wt %, the fluidity of the organic solvent solution is too low to introduce the organic solvent solution into a mixing nozzle.

The above polycarbonate is not specially limited in kind, and it can be selected from a variety of polycarbonates obtained from reactions of dihydric phenols with phosgene or carbonate ester compounds. Examples of the dihydric phenols and carbonate ester compounds are as follows.

(1) Dihydric phenols

Dihydroxyarylalkanes such as 2,2'-bis(4-hydroxyphenyl)propane (bisphenol A), bis(4-hydroxyphenyl)methane, bis(4-hydroxyphenyl)-phenylmethane, bis(4-hydroxyphenyl)naphthyl-methane, bis (4-hydroxyphenyl)-(4-isopropylphenyl)-methane, diphenyl-bis(4-hydroxyphenyl)methane, bis(3,5-dichloro-4-hydroxyphenyl)methane, bis(3,5-dimethyl-4-hydroxyphenyl)methane, 1,1-bis(4-hydroxyphenyl)ethane, 1-naphthyl-1,1-bis(4-hydroxyphenyl)ethane, 1-phenyl-1,1-bis(4-hydroxyphenyl)ethane, 1,2-bis(4-hydroxyphenyl)ethane, 2-methyl-1,1-bis(4-hydroxyphenyl)propane, 2,2-bis(3,5-dimethyl-4-hydroxyhenryl)propane, 1-ethyl-1,1-bis(4-hydroxyphenyl)propane, 2,2-bis(3,5-dichloro-4-hydroxyphenyl)propane, 2,2-bis(3,5-dibromo-4-hydroxyphenl)propane, 2,2-bis(3,5-dichloro-4-hydroxyphenyl)propane, 2,2-bis(3-methyl-4-hydroxyphenyl)propane, 2,2-bis(3-fluoro-4-hydroxyphenyl)propane, 1,1-bis(4-hydroxyphenyl)butane, 3,2-bis(4-hydroxyphenyl)butane, 1,4-bis(4-hydroxyphenyl)butane, 2,2-bis(4-hydroxyphenyl)pentane, 4-methyl-2,2-bis(4-hydroxyphenyl) pentane, 1,1-bis(4-hydroxyphenyl)-cyclohexane, 1,1-bis (3,4-dichloro-4-hydroxyphenyl)cyclohexane, 2,2-bis(4-hydroxyphenyl)hexane, 4,4-bis(4-hydroxyphenyl)heptane, 2,2-bis(4-hydroxyphenyl)-nonane, 1,10-bis(4-hydroxyphenyl)decane and 1,1-bis(4-hydroxyphenyl) cyclododecane; dihdyroxyarylsulfones such as bis(4-hydroxyphenyl)sulfone, bis(3,5-dimethyl-4-hydroxyphenyl)-sulfone and bis(3-chloro-4-hydroxyphenyl)sulfone; dihydroxyaryl ethers such as bis(4-hydroxyphenyl)-ether and bis (3,5-dimethyl-4-hydroxyphenyl)ether; dihydroxyarylketones such as 4,4'-dihydroxybenzophenone and 3,3', 5,5'-tetramethyl-4,4-dihydroxybenzophenone; dihydroxyarylsulfides such as bis(4-hydroxy-phenyl)sulfide, bis(3-methyl-4-hydroxyphenyl)-sulffide and bis(3,5-dimethyl-4-hydroxyphenyl)-sulfide; dihydroxyarylsulfoxides such as bis(4-hydroxyphenyl)sulfoxide; dihydroxydiphenyls such as 4,4'-dihydroxydiphenyl; dihydroxybenzenes such as hydroquinone, resorcinol and methyl-hydroquinone; and dihydroxynaphthalenes such as 1,5-dihydroxy-naphthalene and 2,6-dihydroxy-naphthalene.

(2) Carbonate ester compounds

Diaryl carbonates such as diphenyl carbonate and dialkyl carbonates such as dimethyl carbonate and diethyl carbonate.

The organic solvent is not specially limited, either, if it can dissolve a polycarbonate and can be evaporated and removed with steam. Methylene chloride is preferred as this organic solvent, while the organic solvent can be also selected from chloroform, carbon tetrachloride, dioxane and tetrahydrofuran. These organic solvents may be used alone or as a mixture.

In Process I, the above organic solvent solution and steam are introduced into a mixing nozzle and a polycarbonate is recovered as a powder from a mixture ejected from the mixing nozzle.

In this case, the organic solvent solution and steam are introduced into the mixing nozzle such that the ratio ($W_S/W_O$) of the weight of steam ($W_S$)/the weight of the organic solvent ($W_O$) in the organic solvent solution is 1/10 to 1/5, as described above. The reason for the limitation of $W_S/W_O$ to 1/10 to 1/5 is that when $W_S/W_O$ is smaller than 1/10, the amount of a residual organic solvent in the resultant polycarbonate powder is too large and that when $W_S/W_O$ is larger than 1/5, the resultant polycarbonate powder has too low a bulk density. The $W_S/W_O$ is preferably 1/8 to 1/6.

As the steam, it is preferred to use steam having a pressure (pressure at the time of introduction into the nozzle) of 1 to 100 kg/cm$^2$ and a temperature of 100° to 310° C.

The mixing nozzle into which the organic solvent solution and steam are introduced may have any form, while it preferably has an ejector structure.

The polycarbonate can be recovered from a mixture ejected from the mixing nozzle, for example, by introducing the ejected mixture into a separator such as a gas-solid separating cyclone through a tubing and separating (recovering) the polycarbonate with this separator. In this case, the tubing connecting the mixing nozzle and the separator may be any one of a straight tubing and a curved tubing. The tubing preferably has a diameter (inner diameter) of 5 mm to 25 cm and a length of 50 cm to 1,000 m. The ratio (L/D) of the tubing length (L) to the tubing diameter (inner diameter D) is preferably 100 to 10,000. When this ratio is less than 100, the evaporation of the organic solvent is insufficient. When it exceeds 10,000, the pressure drop is so large that a high-pressure steam is required as the steam which is to be introduced into the mixing nozzle.

According to Process I, when the organic solvent solution of a polycarbonate and steam are introduced into the mixing nozzle and the polycarbonate is recovered as a powder from a mixture ejected from the mixing nozzle, the polycarbonate concentration in the organic solvent solution is defined as described above and the $W_S/W_O$ at the introduction time is defined as described above, whereby there can be facilely obtained a polycarbonate powder of which bulk density is high and the residual solvent amount is small.

Process I can be also applied as part of the step for producing a polycarbonate by an interfacial polycondensation method. In this case, as the organic solvent solution of a polycarbonate which is to be mixed with steam, there is used an organic solvent solution of a polycarbonate obtained by subjecting an emulsion obtained by an interfacial polycondensation reaction to washing and separation procedures.

Process II

The organic solvent solution used in Process II is the same organic solvent solution having a polycarbonate concentration of 3 to 45 wt % as that in Process I. The reason for the restriction of the lower limit of the polycarbonate concentration to 3 wt % is that when it is less than 3 wt %, the productivity of a polycarbonate powder is too low. The reason for the restriction of the upper limit of the polycarbonate concentration to 45 wt % is that when it exceeds 45 wt %, the fluidity of the organic solvent solution is too low to introduce the organic solvent solution into a mixing nozzle (this mixing nozzle used in Process II is sometimes referred to as first mixing nozzle hereinafter). The polycarbonate concentration is particularly preferably 10 to 30 wt. %.

The above polycarbonate is not specially limited in kind, and it can be selected from a variety of polycarbonates obtained from reactions of dihydric phenols with phosgene or carbonate ester compounds. Specific examples of these dihydric phenols and carbonate compounds are various dihydric phenols and various carbonate esters described as examples with regard to Process I.

The organic solvent is not specially limited, either, if it can dissolve a polycarbonate and can be evaporated and removed with steam. Methylene chloride is preferred as this organic solvent, while the organic solvent can be also selected from ethylene chloride, chloroform, carbon tetrachloride, dioxane and tetrahydrofuran as described in Process I. These organic solvents may be used alone or as a mixture.

In Process II, the above organic solvent solution and steam in an amount of $\frac{1}{20}$ to $\frac{1}{8}$ of the weight (to be sometimes referred to as $W_{O1}$ hereinafter) of the organic solvent in the organic solvent solution are introduced into the first mixing nozzle. The reason for the restriction of the lower limit of the weight (to be sometimes referred to as $W_{S1}$) of the steam which is introduced into the first mixing nozzle to $\frac{1}{20}$ of $W_{O1}$ is that when $W_{S1}$ is less than $\frac{1}{20}$ of $W_{O1}$, the removal of the organic solvent by evaporation is insufficient for precipitating a polycarbonate from the organic solvent solution. The reason for the restriction of the upper limit of $W_{S1}$ to $\frac{1}{8}$ of $W_{O1}$ is that when $W_{S1}$ is greater than $\frac{1}{8}$ of $W_{O1}$, the bulk density of the finally obtained polycarbonate is too low.

The pressure of the steam which is to be introduced into the first mixing nozzle (pressure at the time of introduction into the nozzle) is preferably 1 to 100 kg/cm$^2$, particularly preferably 3 to 80 kg/cm$^2$. When the pressure of the steam is less than 1 kg/cm$^2$ there is obtained no mixing rate necessary for mixing the organic solvent solution and the steam. Further, for obtaining a steam having a pressure of greater than 100 kg/cm$^2$, a high-pressure apparatus is required, and the apparatus cost unnecessarily increases.

The first mixing nozzle may have any form of mixing nozzles which are generally used, while it preferably has an ejector structure.

In Process II, the mixture (to be sometimes referred to as first mixture hereinafter) ejected from the above first mixing nozzle is mixed with steam in an amount of $\frac{1}{200}$ to $\frac{1}{1}$ of the weight ($W_{O1}$) of the above organic solvent, after a residence time of 0.001 to 1 second, to obtain a second mixture.

The reason for the restriction of the lower limit of the residence time (to be sometimes referred to as τ hereinafter) to 0.001 second is that when τ is less than 0.001 second, no effect which is to be produced by using steam separately is obtained. The reason for the restriction of the upper limit of τ to 1 second is that when τ exceeds 1 second, the polycarbonate is present as an evaporated and dried solid at the time of mixing it with steam so that no effect which is to be produced by mixing it with steam is obtained.

The reason for the restriction of the lower limit of the weight (to be sometimes referred to as $W_{S2}$ hereinafter) of the steam used for obtaining the second mixture to $\frac{1}{200}$ of $W_{O1}$ is that when $W_{S2}$ is less than $\frac{1}{200}$ of $W_{O1}$, the amount of residual organic solvent in the resultant polycarbonate powder is too large. On the other hand, the reason for the restriction of the upper limit of $W_{S2}$ to $\frac{1}{1}$ of $W_{O1}$ is that even if $W_{S2}$ is increased to more than $\frac{1}{1}$ of $W_{O1}$, the resultant polycarbonate powder shows no change in the bulk density and the amount of residual organic solvent so that the amount of the steam is unnecessarily large.

The second mixture can be obtained, for example, by introducing the first mixture ejected front the first mixing nozzle, into the second mixing nozzle through a tubing to satisfy the above-described residence time and introducing, together with the first mixture, the above-described predetermined amount of steam into the second mixing nozzle. In this case, the second mixing nozzle may also have any form of generally used mixing nozzle, while it preferably has an ejector structure. Further, the second mixture can be also obtained by connecting the first mixing nozzle and a separator to be described later through a tubing, providing a predetermined position of the tubing, i.e., a position where the mixture (first mixture) ejected from the first mixing nozzle satisfies the residence time of 0.001 to 1 second, with another tubing for feeding steam, and mixing the first mixture and the above-described predetermined amount of steam in this position.

In Process II, the polycarbonate is recovered as a powder from the second mixture obtained as described above. This recovery can be carried out, for example, by introducing the second mixture into a separator such as a gas-solid separating cyclone through a tubing and recovering the polycarbonate with this separator. The tubing for introducing the second mixture into the separator may be a straight or curved tubing, while it is required to be long enough to secure the residence time required for the evaporation and drying of the polycarbonate and it is also required to be long enough to compensate the tubing pressure loss relative to the pressure of the steam used. The steam and a vapor of the organic solvent can be recovered by condensing them after the recovery of the polycarbonate powder.

The polycarbonate powder obtained as described above is a powder of which the bulk density is high and the amount of residual organic solvent is small. Further, when the polycarbonate powder is produced by Process II, the polycarbonate powder shows small changes in properties (bulk density and amount of residual solvent) even if the amount of the treated organic solvent solution of the polycarbonate varies. Therefore, when the so-obtained polycarbonate powder is subjected to post treatments such as a drying or granulation step and the subsequent molding thereof in the form of pellets, the mechanical disadvantages (e.g., that the post treatment can be no longer carried out due to a change in the properties of the polycarbonate powder) can be prevented. On the other hand, the polycarbonate powder has a high bulk density, and the apparatus used for the post treatment is hence improved in volume efficiency.

Process II can be also applied as part of the step for producing a polycarbonate by an interfacial polycondensation method. In this case, as the organic solvent solution of a polycarbonate, there is used an organic solvent solution of a polycarbonate obtained by subjecting an emulsion obtained by an interfacial polycondensation reaction to washing and separation procedures.

Process III

The organic solvent solution used in Process III is the same organic solvent solution having a polycarbonate concentration of 3 to 45 wt % as that in each of Processes I and II. The reason for the restriction of the lower limit of the polycarbonate concentration to 3 wt % is that when it is less than 3 wt %, the productivity of a polycarbonate powder is too low. The reason for the restriction of the upper limit of the polycarbonate concentration to 45 wt % is that when it exceeds 45 wt %, the fluidity of the organic solvent solution is too low to introduce the organic solvent solution into the mixing nozzle.

The above polycarbonate is not specially limited in kind, and it can be selected from a variety of polycarbonates obtained From reactions of dihydric phenols with phosgene or carbonate ester compounds. Specific examples of these dihydric phenols and carbonate compounds are various dihydric phenols and various carbonate esters described as examples with regard to Process I.

The organic solvent is not specially limited, either, if it can dissolve a polycarbonate and can be evaporated and removed with steam. Methylene chloride is preferred as this organic solvent, while the organic solvent can be also selected from ethylene chloride, chloroform, carbon tetrachloride, dioxane and tetrahydrofuran as described in Process I. These organic solvents may be used alone or as a mixture.

In Process III, the above organic solvent solution, steam and a polycarbonate powder are introduced into a mixing nozzle, and the polycarbonate is recovered as a powder from a mixture ejected from the mixing nozzle.

As the above steam, it is preferred to use a steam having a pressure (pressure at the time of introduction into the mixing nozzle) of 1 to 100 kg/cm$^2$ and a temperature of 100° to 310° C. The amount of the steam introduced into the mixing nozzle may be the same as that in Process I, i.e., $\frac{1}{10}$ to $\frac{1}{5}$ of the weight of the organic solvent in the organic solvent solution introduced in the mixing nozzle (this case will be referred to as Combination A with Process I hereinafter), or it may be the same as the amount employed in conventional methods, i.e., greater than $\frac{1}{5}$ of the weight of the organic solvent in the organic solvent solution (this case will be referred to as Combination A with Conventional method hereinafter). When the amount off the introduced steam is less than $\frac{1}{10}$, the evaporation of the solvent is insufficient. On the other hand, even if a large amount of steam is introduced into the mixing nozzle, the bulk density and the productivity only decrease. Therefore, the amount off the steam introduced into the mixing nozzle is particularly preferably $\frac{1}{10}$ to $\frac{1}{1}$ of the weight of the organic solvent in the organic solvent solution.

The polycarbonate powder to be introduced into the mixing nozzle may be a polycarbonate powder which has the same quality as, or the different quality from, the polycarbonate dissolved in the above organic solvent solution, while it is preferred to use the same quality polycarbonate powder in view of practical use. For introducing the above polycarbonate powder into the mixing nozzle, the polycarbonate powder alone may be introduced through a specialized tubing, while it is practically preferred to introduce it in the state of a mixture thereof with steam. The polycarbonate powder can be introduced into the mixing nozzle in a state of a mixture thereof with steam, for example, by a method in which a tubing for feeding the polycarbonate powder is provided somewhere between one end of a tubing for feeding steam (to be sometimes referred to as steam line) into the mixing nozzle and the other end thereof, and steam and the polycarbonate powder are mixed within the steam line.

The amount of the polycarbonate powder introduced into the mixing nozzle is preferably 0.5 to 20 %, particularly preferably 1 to 20%, of the weight of the polycarbonate in the organic solvent solution introduced into the mixing nozzle. When the amount of the introduced polycarbonate powder is less than 0.5%, it is difficult to improve the bulk density of the polycarbonate powder to be finally obtained. Further, even if the polycarbonate powder is introduced into the mixing nozzle in an amount of over 20%, there is no major difference in the degree of improvement of the bulk density of the polycarbonate powder to be finally obtained. The particle diameter of the polycarbonate powder to be introduced into the mixing nozzle is preferably 8 mesh or less and 200 mesh or more. When the above particle diameter exceeds 8 mesh, it is liable to be difficult to feed the polycarbonate powder into the mixing nozzle. When it is less than 200 mesh, it is liable to be difficult to feed the polycarbonate powder into the mixing nozzle.

The mixing nozzle into which the organic solvent solution, steam and polycarbonate powder are introduced may have any form, while it preferably has an ejector structure.

The recovery of the polycarbonate from the mixture ejected from the mixing nozzle can be carried out, for example, by introducing the ejected mixture into a separator such as a gas-solid separating cyclone through a tubing and separating (recovering) the polycarbonate with the separator. In this case, the tubing connecting the mixing nozzle and the separator may be any one of a straight tubing and a curved tubing. The tubing preferably has a diameter (inner diameter) of 5 mm to 25 cm and a length of 50 cm to 1,000 m. The ratio (L/D) of the tubing length (L) to the tubing diameter (inner diameter D) is preferably 100 to 10,000. When this ratio is less than 100, the evaporation of the organic solvent is insufficient. When it exceeds 10,000, the pressure drop is so large that a high-pressure steam is required as the steam to be introduced into the mixing nozzle.

The polycarbonate which is finally obtained as above has the form of granules (the polycarbonate in the form of granules, obtained by Process III, is generally called polycarbonate powder in the present invention), and it has a higher bulk density than a polycarbonate powder obtained by a conventional method using a mixing nozzle or by Process I. Further, the amount of residual solvent in the polycarbonate powder obtained by Process III is as small as, or less than, the amount of residual solvent in the polycarbonate powder obtained by any one of the above conventional method and Process I.

Process III can be also applied as part of the step for producing a polycarbonate by an interfacial polycondensation method. In this case, as the organic solvent solution of a polycarbonate, there is used an organic solvent solution of a polycarbonate obtained by subjecting an emulsion obtained by an interfacial polycondensation reaction to washing and separation procedures.

Process IV

The organic solvent solution used in Process IV is the same organic solvent solution having a polycarbonate concentration of 3 to 45 wt % as that in each of Processes I, II and III. The reason for the restriction of the lower limit of the polycarbonate concentration to 3 wt % is that when it is less than 3 wt %, the productivity of a polycarbonate powder is too low. The reason for the restriction of the upper limit of the polycarbonate concentration to 45 wt % is that when it exceeds 45 wt %, the fluidity of the organic solvent solution is too low to introduce the organic solvent solution into the mixing nozzle. The polycarbonate concentration is particularly preferably 10 to 30 wt %.

The above polycarbonate is not specially limited in kind, and it can be selected from a variety of polycarbonates obtained from reactions of dihydric phenols with phosgene or carbonate ester compounds. Specific examples of these dihydric phenols and carbonate compounds are various dihydric phenols and various carbonate esters described as examples with regard to Process I.

Further, the organic solvent is not specially limited, either, if it can dissolve a polycarbonate and can be evaporated and removed with steam. Methylene chloride is preferred as this organic solvent, while the organic solvent can be also selected from ethylene chloride, chloroform, carbon tetrachloride, dioxane and tetrahydrofuran as described in Process I. These organic solvents may be used alone or as a mixture.

In Process IV, the above organic solvent solution, steam and a polycarbonate powder are introduced into a mixing nozzle, and the mixture ejected from the mixing nozzle is introduced into a mixer.

As the above steam introduced into the mixing nozzle, it is preferred to use a steam having a pressure (pressure at the time of introduction into the mixing nozzle) of 1 to 100 kg/cm$^2$ and a temperature of 100° to 310° C. The amount of the steam introduced into the mixing nozzle may be the same as that in Process I, i.e., 1/10 to 1/5 of the weight of the organic solvent in the organic solvent solution introduced into the mixing nozzle (this case will be referred to as Combination B with Process I hereinafter), or it may be the same as the amount employed in conventional methods, i.e., greater than 1/5 of the weight of the organic solvent in the organic solvent solution (this case will be referred to as Combination B with Conventional method hereinafter). When the amount of the introduced steam is less than 1/10, the evaporation of the solvent is insufficient. On the other hand, even if a large amount of steam is introduced into the mixing nozzle, the bulk density and the productivity decrease. Therefore, the amount of the steam introduced into the mixing nozzle is particularly preferably 1/10 to 1/1 of the weight of the organic solvent in the organic solvent solution.

The mixing nozzle into which the above steam and the above-described organic solvent solution are introduced may have any form, while it particularly preferably has an ejector structure.

The mixer into which the mixture ejected from the mixing nozzle is introduced may be any one of a dynamic mixer and a static mixer, while a dynamic mixer having crushing capability is preferred. Specific examples of the dynamic mixer include a pipe-line homomixer and a homomic line flow supplied by Tokushu Kika Kogyo Co., Ltd., a multi-line mixer supplied by Satake Chemical Equipment MFG., Ltd., and a Komatsu disintegrator supplied by KOMATSU ZENOAH Co. Specific examples of the static mixer include a Kenix static mixer, a Sulzer static mixer and a Toray static mixer.

The position where the mixer is arranged is preferably in a position where L/1* is at least 5, particularly at least 10, in which L is a flow path length from the mixing nozzle to the gas-solid separator and 1* is a flow path length from the mixing nozzle to the mixer. When the mixer is arranged in a position where L/1* is less than 5, the effect on the improvement of the bulk density of the polycarbonate powder is low as compared with a case where L/1* is at least 5. In addition, L means a flow path length from the external end face of the ejecting outlet of the mixing nozzle to the external end face of the inlet of the gas-solid separator. Further, 1* means a flow path length from the external end face of the ejecting outlet of the mixing nozzle to the internal end face of the intake of the mixer.

When the dynamic mixer is used, the blade end velocity is preferably 50 to 2,500 m/minute, particularly preferably 100 to 1,500 m/minute. When the blade end velocity is less than 50 m/minute, the effect on the improvement of the bulk density of the resultant polycarbonate is low as compared with the case where the blade end velocity is 50 to 2,500 m/minute. Even if the mixer is actuated at a rate of over 2,500 m/minute, no further improvement of the bulk density is observed.

In Process IV, the mixture outletted from the above mixer is introduced into a gas-solid separator through a tubing, and the polycarbonate powder is recovered with this gas-solid separator. The recovery of the polycarbonate powder with the gas-solid separator can be carried out by a conventional method using a general gas-solid separator typified by a gas-solid separating cyclone.

Each of the above tubing for connecting the mixing nozzle and the mixer and a tubing for connecting the mixer and the gas-solid separator may be any one of a straight tubing and a curved tubing, while the tube diameter (inner diameter) D of each tubing is preferably 5 mm to 25 cm, and the ratio (L/D) of the above flow path L to this tube diameter D is preferably 100 to 10,000. When this ratio is less than 100, the evaporation of the organic solvent is insufficient. When it exceeds 10,000, the pressure drop is so large that a high-pressure steam is required as the steam to be introduced into the mixing nozzle.

The polycarbonate which is finally obtained as above has the form of granules (the polycarbonate in the form of granules, obtained by Process IV, is generally called polycarbonate powder in the present invention), and it has a higher bulk density than a polycarbonate powder obtained by a conventional method using a mixing nozzle or by Process I when those polycarbonates whose residual amounts of solvent are equivalent are compared. Further, the amount of residual solvent in this polycarbonate powder having a high bulk density is substantially equivalent to the amount of residual solvent in the polycarbonate powder obtained by any one of the above conventional method and Process I.

Process IV can be also applied as part of the step for producing a polycarbonate by an interfacial polycondensation method. In this case, as the organic solvent solution of a polycarbonate, there is used an organic solvent solution of a polycarbonate obtained by subjecting an emulsion obtained by an interfacial polycondensation reaction to washing and separation procedures.

Examples of the present invention will be explained hereinafter.

Example 1 (Process 1)

TOUGHLON A2500 (trade name) supplied by Idemitsu Petrochemical Co., Ltd. as a polycarbonate (to be sometimes referred to as PC hereinafter) was dissolved in methylene chloride (special grade, supplied by Hiroshima Wako Pure Chemical Industries, Ltd., to be some times referred to as MC hereinafter) to prepare a solution of 13 wt % of PC in methylene chloride (to be referred to as PCMC hereinafter).

Then, the above PCMC and a steam having a pressure of 14 kg/cm$^2$ and a temperature of 195° C. were concurrently introduced into a mixing nozzle with a diaphragm pump at rates of 172.4 kg/hr and 25 kg/hr, respectively. In this case, the ratio ($W_S/W_{MC}$) of the weight of the steam ($W_S$) to the weight of methylene chloride ($W_{MC}$) was 1/5.

A mixing nozzle of which the structure is shown in FIG. 1 was used as the mixing nozzle. This mixing nozzle 1 is provided with a first nozzle 3 having an ejector outlet 2 and a second nozzle 4 which is disposed such that the outer wall of an ejection head is brought into contact with the inner wall of the ejection head of the first nozzle 3. And, a mixing chamber 5 is formed in an inner space of the ejection head of the first nozzle 3. Further, the ejection head of the first nozzle 3 is provided with a through opening 6 communicating with the mixing chamber 5, and this through opening 6 communicates with a PCMC feed tube 7. The ejection head of the first nozzle 3 has an outer diameter, a, of 50 mm, the mixing chamber 5 has a maximum diameter, b, of 30 mm, the mixing chamber 5 has a distance, c, of 50 mm from the top of the second nozzle 4 to the end surface of the mixing chamber 5 on the ejector outlet 2 side, and the narrowest portion of the second nozzle in the inner space has a diameter, d, of 5 mm. In this mixing nozzle 1, PCMC introduced into the mixing chamber 5 through the PCMC feed tube 7 and the through opening 6 is mixed with a steam introduced into the mixing chamber 5 through the second nozzle 4 to form a mixture, and the mixture is ejected through the ejector outlet 2.

A mixture ejected from the mixing nozzle 1 was introduced into a cyclone having an internal volume of 0.3 m$^3$ through a stainless steel tubing of which the inner diameter (D) was 10 mm, the tube length (L) was 10 m and L/D was 1,000.

After the operation for 1 hour, the intended PC powder having a high bulk density was obtained from the bottom of the cyclone. Table 1 shows the bulk density of the obtained PC powder having a high bulk density and the amount of residual mount thereof (to be referred to as residual MC amount hereinafter). Further, Table 1 also shows the residual MC amount found after the PC powder having a high bulk density was dried at 120° C. for 4 hours (to be referred to as after-dry residual MC amount).

Example 2 (Process I)

A PC powder having a high bulk density was obtained in the same manner as in Example 1 except that PCMC was introduced into the mixing nozzle 1 at a rate of 215.5 kg/hr and that $W_S/W_{MC}$ was changed to 1/7.5.

Table 1 shows the bulk density, residual MC amount and after-dry residual MC amount of the so-obtained PC powder having a high bulk density.

Example 3 (Process I)

A PC powder having a high bulk density was obtained in the same manner as in Example 1 except that PCMC was introduced into the mixing nozzle 1 at a rate of 258.6 kg/hr and that $W_S/W_{MC}$ was changed to 1/9.

Table 1 shows the bulk density, residual MC amount and after-dry residual MC amount of the so-obtained PC powder having a high bulk density.

Example 4 (Process I)

A PC powder having a high bulk density was obtained in the same manner as in Example 1 except that the PC concentration in PCMC was changed to 8 wt % that this PCMC was introduced into the mixing nozzle 1 at a rate of 203.8 kg/hr and that $W_S/W_{MC}$ was changed to 1/7.5.

Table 1 shows the bulk density, residual MC amount and after-dry residual MC amount of the so-obtained PC powder having a high bulk density.

Example 5 (Process I)

A PC powder having a high bulk density was obtained in the same manner as in Example 1 except that the PC concentration in PCMC was changed to 25 wt %, that this PCMC was introduced into the mixing nozzle 1 at a rate of 250 kg/hr and that $W_S/W_{MC}$ was changed to 1/7.5.

Table 1 shows the bulk density, residual MC amount and after-dry residual MC amount of the so-obtained PC powder having a high bulk density.

Example 6 (Process I)

As the mixing nozzle, there was used a mixing nozzle which was structurally the same as the mixing nozzle 1 shown in FIG. 1 and in which the ejection head of the first nozzle 3 had a diameter. a, of 150 mm, the mixing chamber 5 had a maximum diameter, b, of 90 mm, the mixing chamber 5 had a distance, c, of 100 mm from the top of the second nozzle 4 to the end surface of the mixing chamber 5 on the ejector outlet 2 side, and the narrowest portion of the second nozzle 2 in the inner space had a diameter, d, of 15 min. And, PCMC having a PC concentration of 13 wt % and a steam having a pressure of 14 kg/cm$^2$ and a temperature of 195° C. were introduced into the mixing nozzle with a diaphragm pump at rates of 1,724 kg/hr and 200 kg/hr. respectively. In this case, $W_S/W_{MC}$ was 1/7.5.

A mixture ejected from the mixing nozzle was introduced into a cyclone having an internal volume of 2 m$^3$ through a stainless steel tubing of which the inner diameter (D) was 30 mm, the tube length (L) was 30 m and L/D was 1,000.

After the operation for 1 hour, the intended PC powder having a high bulk density was obtained from the bottom of the cyclone. Table 1 shows the bulk density, residual MC amount and after-dry residual MC amount of the so-obtained PC powder having a high bulk density.

Comparative Example 1

A PC powder having a high bulk density was obtained in the same manner as in Example 1 except that PCMC was introduced into the mixing nozzle 1 at a rate of 114.9 kg/hr and that $W_S/W_{MC}$ was changed to 1/4.

Table 1 shows the bulk density, residual MC amount and after-dry residual MC amount of the so-obtained PC powder having a high bulk density.

Comparative Example 2

A PC powder having a high bulk density was obtained in the same manner as in Example 1 except that PCMC was introduced into the mixing nozzle 1 at a rate of 57.5 kg/hr and that $W_S/W_{MC}$ was changed to 1/2.

Table 1 shows the bulk density, residual MC amount and after-dry residual MC amount of the so-obtained PC powder having a high bulk density.

Comparative Example 3

A PC powder having a high bulk density was obtained in the same manner as in Example 1 except that PCMC was introduced into the mixing nozzle 1 at a rate of 344.8 kg/hr and that $W_S/W_{MC}$ was changed to 1/12.

Table 1 shows the bulk density, residual MC amount and after-dry residual MC amount of the so-obtained PC powder having a high bulk density.

TABLE 1

| | PC concentration in PCMC *1 (wt %) | $W_S/W_{MC}$ *2 | PC Powder | | |
|---|---|---|---|---|---|
| | | | Bulk density (g/cc) | Residual MC amount (wtppm) | After-dry residual MC amount (wtppm) |
| Ex. 1 | 13 | 1/6 | 0.41 | 90 | <10 |
| Ex. 2 | 13 | 1/7.5 | 0.48 | 90 | <10 |
| Ex. 3 | 13 | 1/9 | 0.55 | 100 | <10 |
| Ex. 4 | 8 | 1/7.5 | 0.50 | 100 | <10 |
| Ex. 5 | 25 | 1/7.5 | 0.47 | 90 | <10 |
| Ex. 6 | 13 | 1/7.5 | 0.48 | 90 | <10 |
| CEx. 1 | 13 | 1/4 | 0.35 | 90 | <10 |
| CEx. 2 | 13 | 1/2 | 0.25 | 90 | <10 |
| CEx. 3 | 13 | 1/12 | 0.50 | 20,000 | 500 |

Ex. = Example, CEx. = Comparative Example
*1: Showing PC concentration in PCMC.
*2: Showing ratio of weight of steam ($W_S$) introduced into mixing nozzle to weight of methylene chloride ($W_{MC}$) introduced into mixing nozzle.

As clearly shown in Table 1, each of the PC powders having a high bulk density, obtained in Examples 1 to 6 wherein $W_S/W_{MC}$ was set within the limited range of Process I, had a bulk density of 0.41 to 0.55 g/cc. These values are far greater than any bulk density (0.35–0.25 g/cc) of the PC powders obtained in Comparative Examples 1 and 2 wherein $W_S/W_{MC}$ was made larger than the upper limit of the limited range of Process I.

Further, the residual MC amount of each of the PC powders having a high bulk density, obtained in Examples 1 to 6, is as small as 90 to 100 wtppm, and these values are equivalent to the residual MC amounts (90 wtppm) of the PC powders obtained in Comparative Examples 1 and 2. Concerning the after-dry residual MC amount, further, all the PC powders obtained in Examples 1 to 6 showed very small amounts, as small as 10 wtppm, similarly to the PC powders obtained in Comparative Examples 1 and 2.

In addition, the PC powder obtained in Comparative Example 3 wherein $W_S/W_{MC}$ was made smaller than the flower limit of the limited range of Process 1 has a high bulk density, as high as 0.50 g/cc, whereas the residual MC amount and after-dry residual MC amount are very large.

Example 7 (Process II)

Figure 2:
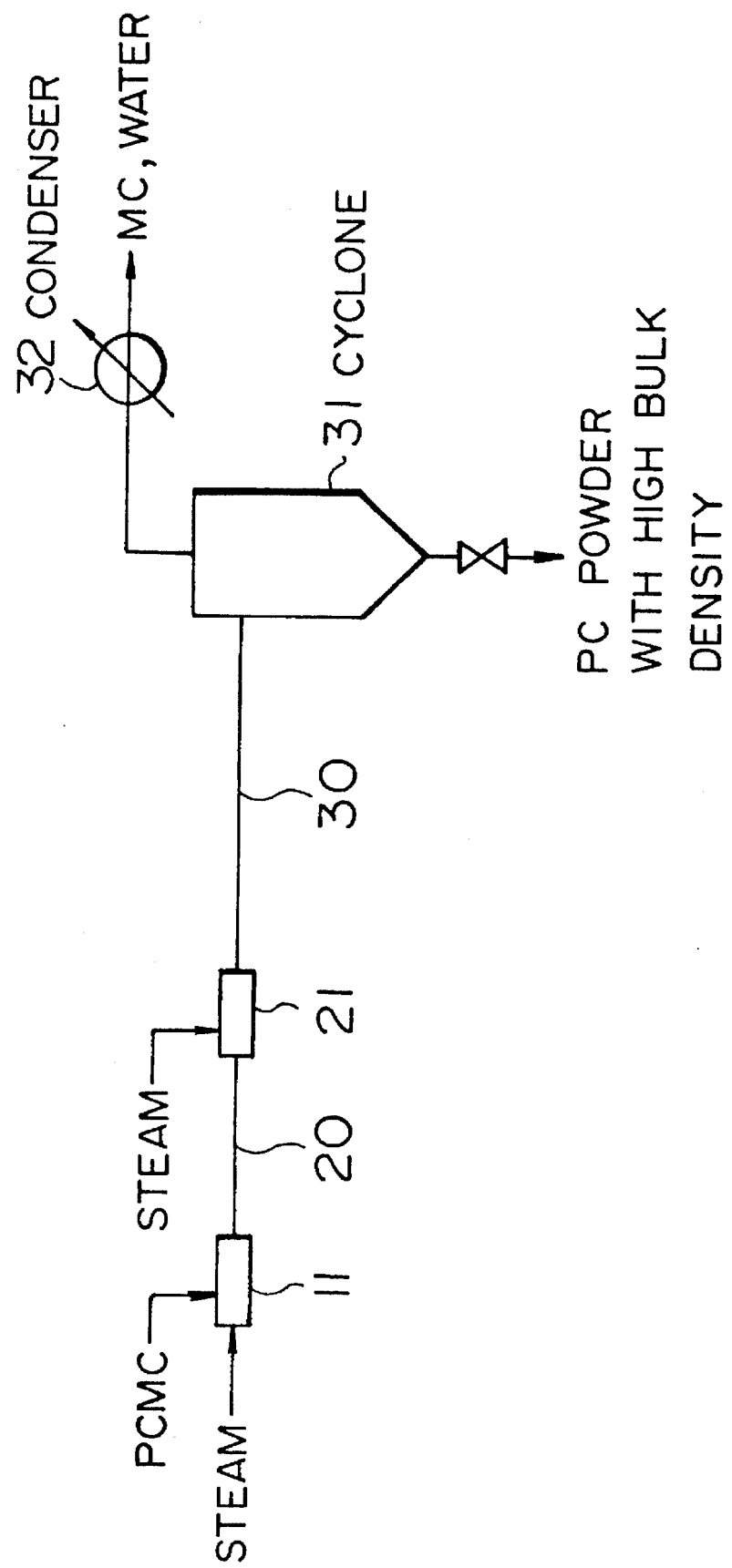
FIG. 2 is a schematic view of an apparatus used for obtaining a polycarbonate powder having a high bulk density in Examples 7 to 22.

An apparatus shown in FIG. 2 was used, which had a first mixing nozzle 11 into which PCMC and a steam were introduced, a second mixing nozzle 21 into which a mixture ejected from the this first mixing nozzle 11 was introduced through a tubing 20 and a steam was also introduced, and a cyclone into which a mixture (second mixture) ejected from this second mixing nozzle 21 was introduced through a tubing 30. A PC powder having a high bulk density was produced in the following manner on the basis of Process II.

First. TOUGHLON A2200 (trade name) supplied by Idemitsu Petrochemical Co.. Ltd. was used as PC. This PC was dissolved in methylene chloride (MC) [special grade, supplied by Hiroshima Wako Pure Chemical Industries, Ltd.] to prepare PCMC having a PC concentration of 15 wt %.

Then, the above PCMC and a steam having a pressure of 15 kg/cm² and a temperature of 200° C. were introduced into the mixing nozzle 11 with a diaphragm pump at rates of 140 kg/hr and 10 kg/hr, respectively. In this case, the weight of the steam ($W_{S1}$) was 1/11.9 as large as the weight of the methylene chloride ($W_{MC}$).

Figure 3:
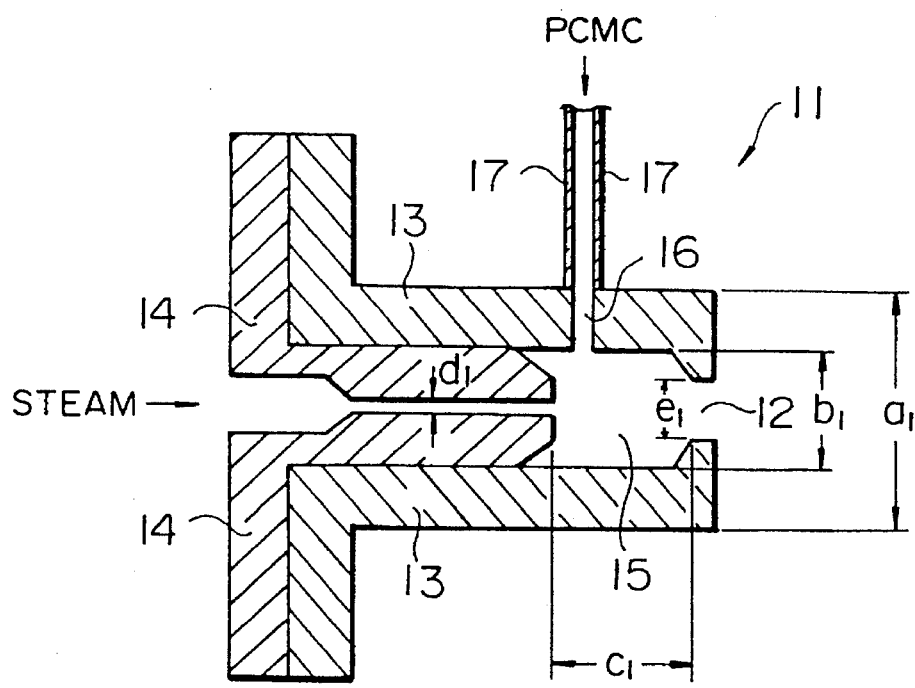
FIG. 3 is a cross-sectional view of a first mixing nozzle used in Examples 7 to 22.

As the first mixing nozzle 11, there was used a mixing nozzle having a structure shown in FIG. 3. That is, this first mixing nozzle 11 is provided with a first nozzle 13 having an ejector outlet 12 and a second nozzle 14 which is disposed such that the outer wall of an ejection head is brought into contact with the inner wall of the ejection head of the first nozzle 13. And a mixing chamber 15 is formed in an inner space of the ejection head of the first nozzle 13. Further, the ejection head of the first nozzle 13 is provided with a through opening 16 communicating with the mixing chamber 15, and this through opening 16 communicates with a PCMC feed tube 17. The ejection head of the first nozzle 13 has an outer diameter, $a_1$, of 50 mm, the mixing chamber 15 has a maximum diameter, $b_1$, of 30 mm, the mixing chamber 15 has a distance, $c_1$, of 50 mm from the top of the second nozzle 14 to the end surface of the mixing chamber 15 on the ejector outlet 12 side, the narrowest portion of the second nozzle 14 in the inner space has a diameter, $d_1$, of 5 mm, and the ejector outlet 12 has a diameter, $e_1$, of 10 min. In this mixing nozzle 11, PCMC introduced into the mixing chamber 15 through the PCMC feed tube 17 and the through opening 16 is mixed with a steam introduced into the mixing chamber 15 through the second nozzle 14 to form a mixture, and the mixture is ejected through the ejector outlet 12.

A mixture ejected from the first mixing nozzle 11 was introduced into the second mixing nozzle 21 through the tubing 20. As this tubing 20, a stainless steel tubing having an inner diameter of 10 mm was used, and the length of the tubing 20 was made long enough to secure a mixture residence time, τ, of 0.01 second. Further, Separately, a steam having a pressure of 15 kg/cm² and a temperature of 200° C. was concurrently introduced into this second mixing nozzle 21 at a rate of 3 kg/hr. In this case, the weight of the steam ($W_{S2}$) was 1/39.7 as large as the weight of MC ($W_{MC}$) introduced into the first mixing nozzle 11.

Figure 4:
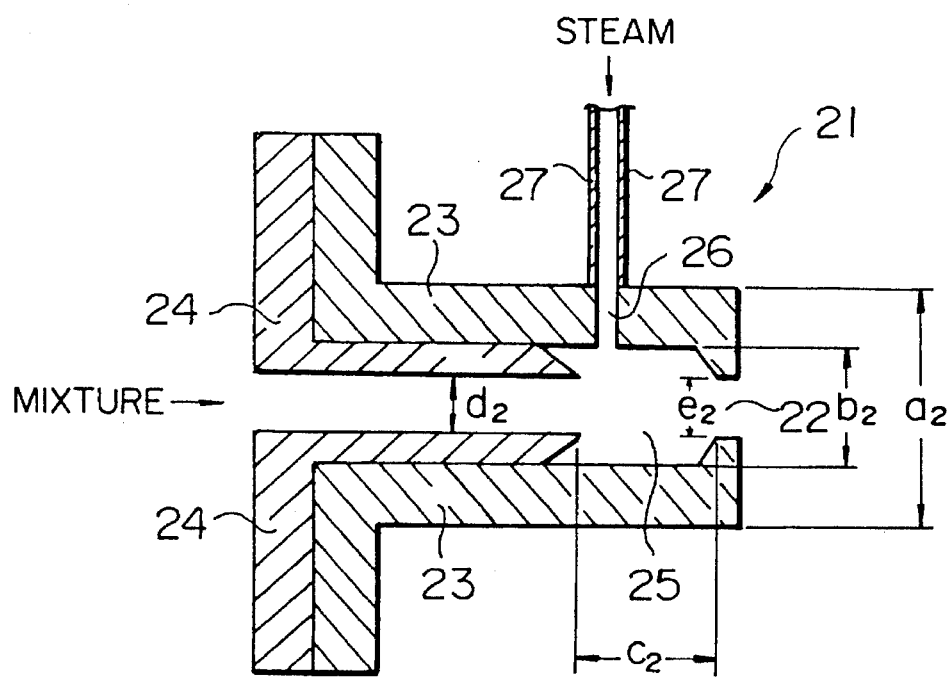
FIG. 4 is a cross-sectional view of a second mixing nozzle used in Examples 7 to 22.

As the second mixing nozzle 21, there was used a mixing nozzle having a structure shown in FIG. 4. That is, this second mixing nozzle 21 is provided with a first nozzle 23 having an ejector outlet 22 and a second nozzle 24 which is disposed such that the outer wall of an ejection head is brought into contact with the inner wall of the ejection head of the first nozzle 23. And, a mixing chamber 25 is formed in an inner space of the ejection head of the first nozzle 23. Further, the ejection head of the first nozzle 23 is provided with a through opening 26 communicating with the mixing chamber 25, and this through opening 26 communicates with a steam feed tube 27. The ejection head of the first nozzle 23 has an outer diameter, $a_2$, of 50 mm, the mixing chamber 25 has a maximum diameter, $b_2$, of 30 mm, the mixing chamber 25 has a distance, $c_2$, of 50 mm from the top of the second nozzle 24 to the end surface of the mixing chamber 25 on the ejector outlet 22 side, the narrowest portion of the second nozzle 24 in the inner space has a diameter, $d_2$, of 10 mm, and the ejector outlet 22 has a diameter, $e_2$, of 10 mm. In this mixing nozzle 21, the mixture introduced from the first mixing nozzle 11 into the second mixing nozzle 24 through the tubing 20 is introduced into the mixing chamber 25 through the second nozzle 24, and in this mixing chamber 25, the mixture is mixed with a steam introduced into the mixing chamber 25 through the steam feed tube 27 and the through opening 27 and ejected through the ejector outlet 22.

The mixture (second mixture) ejected from the second mixing nozzle 21 was introduced into the cyclone 31 through the tubing 30. A PC powder was separated (recovered) with this cyclone 31, and MC and the steam were recovered by condensing them with a condenser 32. As the tubing 30, a stainless steel tube having an inner diameter of 10 mm and a length of about 20 mm was used.

The apparatus shown in FIG. 2 was operated continuously for 2 hours. During the operation, no troubles such as clogging occurred, and the operation was stably carried out.

After the operation for 2 hours, the intended PC powder having a high bulk density was obtained from the bottom of the cyclone 31. Table 2 shows the bulk density and residual MC amount of the so-obtained PC powder having a high bulk density.

Examples 8–18 (Process II)

PC powders having a high bulk density were obtained with the apparatus shown in FIG. 2 in the same manner as in Example 7 except that the amounts of PCMC and steam introduced into the first mixing nozzle 11 and the amount of steam introduced into the second mixing nozzle 21 were changed as shown in Table 2 and that the length of the tubing 20 connecting the first mixing nozzle 11 and the second mixing nozzle 21 was properly set such that the residence time, $\tau$, of the mixture showed periods of time as shown in Table 2.

Table 2 shows the bulk density and residual MC amount of each of the so-obtained PC powders having a high bulk density.

During the operation of the apparatus in Examples 8 to 18, no troubles such as clogging occurred, and the operation was stably carried out.

Example 19 (Process II)

A PC powder having a high bulk density was obtained with the apparatus shown in FIG. 2 in the same manner as in Example 7 except that PCMC having a PC concentration of 12 wt % was used. In addition, with a decrease of the PC concentration from 15 wt % (Example 7) to 12 wt %, the amount of steam, $W_{S1}$ (=10 kg/hr), introduced into the first mixing nozzle 11 was 1/12.3 as large as the amount ($W_{MC}$) of MC introduced, and $W_{S2}$ (=3 kg/hr) introduced into the second mixing nozzle 21 was 1/41.1 as large as $W_{MC}$.

Table 2 shows the bulk density and residual MC amount of the so-obtained PC powder having a high bulk density.

During the operation, no troubles such as clogging occurred, and the operation was stably carried out.

Example 20 (Process II)

A PC powder having a high bulk density was obtained with the apparatus shown in FIG. 2 in the same manner as in Example 7 except that PCMC having a PC concentration of 27 wt % was used. In addition, with an increase of the PC concentration from 15 wt % (Example 7) to 27 wt %, the amount of steam. $W_{S1}$ (=10 kg/hr), introduced into the first mixing nozzle 11 was 1/10.2 as large as the amount ($W_{MC}$) of MC introduced, and $W_{S2}$ (=3 kg/hr) introduced into the second mixing nozzle 21 was 1/34.1 as large as $W_{MC}$.

Table 2 shows the bulk density and residual MC amount of the so-obtained PC powder having a high bulk density.

During the operation, no troubles such as clogging occurred, and the operation was stably carried out.

Examples 21–22 (Process II)

PC powders having a high bulk density were obtained with the apparatus shown in FIG. 2 in the same manner as in Example 7 except that the amounts of PCMC and steam introduced into the first mixing nozzle 11 and the amount of steam introduced into the second mixing nozzle 21 were changed as shown in Table 2. However, the inner diameter of the tubing 20 connecting the first mixing nozzle 11 and the second mixing nozzle 21 was changed to 20 mm in Example 21 or to 35 mm in Example 22 such that the residence time, $\tau$, of the mixture was 0.01 second similarly to Example 7.

Table 2 shows the bulk density and residual MC amount of each of the so-obtained PC powders.

During the operation of the apparatus in Examples 21–22, no troubles such as clogging occurred, and the operation was stably carried out.

Comparative Example 4

A PC powder was obtained with the apparatus shown in FIG. 2 in the same manner as in Example 7 except that no steam was fed to the second mixing nozzle 21 as shown in Table 3.

In this case, it was found that both a PC powder and MC (liquid) as a solvent were outletted from the cyclone 31 side outlet of the tubing 30 connecting the second mixing nozzle 21 and cyclone 31, which was unsuitable in practical operation.

Table 3 shows the bulk density and residual MC amount of the so-obtained PC powder.

Comparative Examples 5–8

Attempts were made to produce PC powders with the apparatus shown in FIG. 2 in the same manner as in Example 7 except that the amount of steam introduced into the first mixing nozzle 11 or the amount of steam introduced into the second mixing nozzle 21 was set outside the limited range of Process II as shown in Table 3. However, the length of the tubing 20 connecting the first mixing nozzle 11 and the second mixing nozzle 21 was properly changed such that the residence time, $\tau$, of each mixture was 0.01 second similarly to Example 7.

Table 3 shows the results.

Comparative Example 9

A PC powder was obtained with the apparatus shown in FIG. 2 in the same manner as in Example 7 except that the amounts of PCMC and steam introduced into the first mixing nozzle 11 and the amount of steam introduced into the second mixing nozzle 21 were respectively changed as shown in Table 3 such that the amount of steam introduced into the first mixing nozzle 11 and the amount of steam introduced into the second mixing nozzle 21 were outside the limited ranges of Process II. However, the length of the tubing 20 connecting the first mixing nozzle 11 and the second mixing nozzle 21 was properly changed such that the residence time, $\tau$, of the mixture was 0.01 second similarly to Example 7.

Table 3 shows the bulk density and residual MC amount of the so-obtained PC powder.

Comparative Examples 10–11

PC powders were obtained with the apparatus shown in FIG. 2 in the same manner as in Example 7 except that the length of the tubing 20 connecting the first mixing nozzle 11 and the second mixing nozzle 21 was thanked such that residence time, $\tau$, of each mixture was set as shown in Table 3.

Table 3 shows the bulk density and residual MC amount of each of the so-obtained PC powders.

Comparative Example 12

A PC powder was obtained with the apparatus shown in FIG. 2 in the same manner as in Example 7 except that the amount of PCMC introduced into the first mixing nozzle 11 and the amount of steam introduced into the second mixing nozzle 21 were respectively changed as shown in Table 3 and that the length of the tubing 20 connecting the first mixing nozzle 11 and the second mixing nozzle 21 was changed such that the residence time, $\tau$, of the mixture was 0.0005 second which was outside the limited range of Process II.

Table 3 shows the bulk density and residual MC amount of the so-obtained PC powder.

bulk density, 0.05 to 0.35 g/cc, of the PC powders obtained by a conventional method using one mixing nozzle. Further, in the PC powders having a high bulk density, obtained in Examples 7 to 22, the residual MC amount is as low as 20 to 100 wtppm. Further, the amount of the organic solvent solution of PC to be treated is varied in the range of 50 to 900 kg/hr in Examples 7 to 12, while the PC powders having a high bulk density are stably obtained in each Example, and the variations of the properties are small among the obtained PC powders having a high bulk density.

On the other hand, as is clearly shown in Table 3, Comparative Examples 4 to 12 cause difficulties, that is, no PC powder is obtained (Comparative Example 6), not only a PC powder but also MC as a solvent are outletted (Comparative Example 4), the obtained PC powders have a low bulk density (Comparative Examples 5, 7, 8, 9, 11 and 12), and the obtained PC powder shows a high MC residual

TABLE 2

| | First Mixing Nozzle | | | | Second Mixing Nozzle Steam | | | PC powder having high bulk density | |
|---|---|---|---|---|---|---|---|---|---|
| | PCMC | | Steam | | Amount | | Residence | | |
| | PC concentration (wt %) | Amount introduced (kg/hr) | Amount introduced (kg/hr) | Ratio to $W_{MC}$ (times) | introduced $W_{S2}$ (kg/hr) | Ratio to $W_{MC}$ (times) | time of mixture $\tau$ (second) | Bulk density (g/cc) | Residual MC amount (wtppm) |
| Ex. 7 | 15 | 140 | 10 | 1/11.9 | 3 | 1/39.7 | 0.01 | 0.49 | 40 |
| Ex. 8 | 15 | 140 | 8 | 1/14.9 | 10 | 1/11.9 | 0.005 | 0.46 | 60 |
| Ex. 9 | 15 | 140 | 6 | 1/19.8 | 50 | 1/2.4 | 0.03 | 0.49 | 45 |
| Ex. 10 | 15 | 140 | 10 | 1/11.9 | 1 | 1/119 | 0.01 | 0.42 | 90 |
| Ex. 11 | 15 | 140 | 10 | 1/11.9 | 10 | 1/11.9 | 0.01 | 0.45 | 30 |
| Ex. 12 | 15 | 140 | 10 | 1/11.9 | 100 | 1/1.2 | 0.01 | 0.48 | 40 |
| Ex. 13 | 15 | 140 | 10 | 1/11.9 | 3 | 1/39.7 | 0.001 | 0.36 | 80 |
| Ex. 14 | 15 | 200 | 20 | 1/8.5 | 10 | 1/17.0 | 0.02 | 0.51 | 45 |
| Ex. 15 | 15 | 200 | 20 | 1/8.5 | 10 | 1/17.0 | 0.02 | 0.46 | 30 |
| Ex. 16 | 15 | 200 | 25 | 1/6.8 | 50 | 1/3.4 | 0.005 | 0.39 | 30 |
| Ex. 17 | 15 | 50 | 5 | 1/8.5 | 10 | 1/4.3 | 0.01 | 0.41 | 50 |
| Ex. 18 | 15 | 50 | 3 | 1/14.2 | 1 | 1/42.5 | 0.01 | 0.39 | 45 |
| Ex. 19 | 12 | 140 | 10 | 1/12.3 | 3 | 1/41.1 | 0.01 | 0.54 | 20 |
| Ex. 20 | 27 | 140 | 10 | 1/10.2 | 3 | 1/34.1 | 0.01 | 0.44 | 100 |
| Ex. 21 | 15 | 400 | 40 | 1/8.5 | 12 | 1/28.3 | 0.01 | 0.48 | 55 |
| Ex. 22 | 15 | 900 | 90 | 1/8.5 | 30 | 1/25.5 | 0.01 | 0.46 | 30 |

Ex. = Example, CEx. = Comparative Example

TABLE 3

| | First Mixing Nozzle | | | | Second Mixing Nozzle Steam | | | PC powder having high bulk density | |
|---|---|---|---|---|---|---|---|---|---|
| | PCMC | | Steam | | Amount | | Residence | | |
| | PC concentration (wt %) | Amount introduced (kg/hr) | Amount introduced (kg/hr) | Ratio to $W_{MC}$ (times) | introduced $W_{S2}$ (kg/hr) | Ratio to $W_{MC}$ (times) | time of mixture $\tau$ (second) | Bulk density (g/cc) | Residual MC amount (wtppm) |
| CEx. 4 | 15 | 140 | 10 | 1/11.9 | 0 | — | 0.01 | 0.25 | 1,800 |
| CEx. 5 | 15 | 140 | 2 | 1/59.5 | 10 | 1/11.9 | 0.01 | 0.10 | 12,000 |
| CEx. 6 | 15 | 140 | 1 | 1/119 | 10 | 1/11.9 | 0.01 | Not powdered | |
| CEx. 7 | 15 | 140 | 500 | 1/0.238 | 10 | 1/11.9 | 0.01 | 0.12 | <10 |
| CEx. 8 | 15 | 140 | 10 | 1/11.9 | 200 | 1/0.595 | 0.01 | 0.32 | 360 |
| CEx. 9 | 15 | 50 | 10 | 1/4.25 | 200 | 1/0.213 | 0.01 | 0.13 | <10 |
| CEx. 10 | 15 | 140 | 10 | 1/11.9 | 3 | 1/39.7 | 3 | 0.41 | 32,000 |
| CEx. 11 | 15 | 140 | 10 | 1/11.9 | 3 | 1/39.7 | 0.0005 | 0.16 | 30 |
| CEx. 12 | 15 | 200 | 10 | 1/17.0 | 10 | 1/17.0 | 0.0005 | 0.14 | 120 |

Ex. = Example, CEx. = Comparative Example

As is clearly shown in Table 2, the PC powders having a high bulk density, obtained in Examples 7 to 12, have a bulk density of 0.36 to 0.54 g/cc. These values are greater than the amount although it has a high bulk density (Comparative Example 10).

Example 23 (Process II; Combination A with Process I)

With an apparatus shown in FIG. 5, which had a mixing nozzle 41 into which PCMC, a steam and a PC powder (abbreviated as PCF in the drawing) were introduced and a cyclone 51 into which a mixture ejected from this mixing nozzle 41 was introduced through a tubing 50, a PC powder having a high bulk density was produced in the following manner.

First, TOUGHLON A2500 (trade name) supplied by Idemitsu Petrochemical Co., Ltd. was used as PC. This PC was dissolved in methylene chloride (MC) [special grade, supplied by Hiroshima Wako Pure Chemical Industries, Ltd.] to prepare PCMC having a PC concentration of 13 wt %.

Then, the above PCMC, a steam having a pressure of 14 kg/cm$^2$ and a temperature of 195° C. and a PC powder (trade name: TOUGHLON FN2200, supplied by Idemitsu Petrochemical Co., Ltd., particle diameter: 10–100 mesh, to be referred to as PCF hereinafter) were introduced into the mixing nozzle 41 with a diaphragm pump at rates (feed rates) of 215.5 kg/hr, 25 kg/hr and 1.4 kg/hr, respectively. The PCF was fed to a steam line (not shown in FIG. 5) from a hopper (not shown in FIG. 5) of which the internal pressure was maintained at the same level as that of the steam pressure, through a rotary valve (not shown in FIG. 5) and introduced into the mixing nozzle 41 in a state in which the PCF was mixed with steam.

In this case, the amount (weight per unit hour, having the same meaning hereinafter) of steam introduced into the mixing nozzle 41 was 1/15 as large as the weight (weight per unit hour, having the same meaning hereinafter) of MC in PCMC introduced into the mixing nozzle 41, and the amount (weight per unit hour, having the same meaning hereinafter) of PCF introduced into the mixing nozzle 41 was 5% of the weight of PC in PCMC introduced into the mixing nozzle 41.

As the mixing nozzle 41, there was used a mixing nozzle having the same form and the same size as those of the mixing nozzle shown in FIG. 1.

Figure 5:
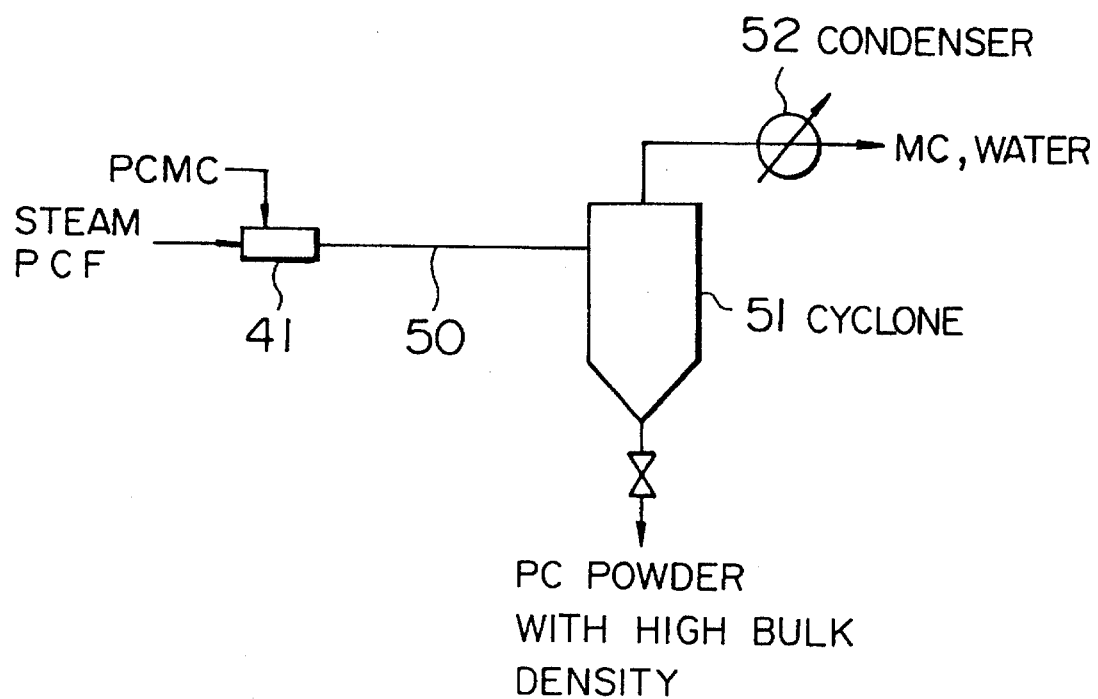
FIG. 5 is a schematic view of an apparatus used for obtaining a polycarbonate powder having a high bulk density in Examples 3 to 32.

A mixture ejected from the mixing nozzle 41 was introduced into the cyclone 51 having an internal volume of 0.3 m$^3$ through a stainless steel tubing 50 having an inner diameter (D) of 10 mm, a tube length (L) of 10 m and an L/D of 1,000, as shown in FIG. 5. A PC powder was separated (recovered) with this cyclone, and MC and the steam were also recovered by condensing them with a condenser 52.

After the apparatus shown in FIG. 5 was operated for 1 hour, the intended PC powder having a high bulk density was obtained from the bottom of the cyclone 51. Table 4 shows the bulk density and residual MC amount of the so-obtained PC powder having a high bulk density.

Examples 24–28 (Process III: Combination A with Process I)

PC powders having a high bulk density were obtained with the apparatus shown in FIG. 5 in the same manner as in Example 23 except that the amounts of PCMC and PCF introduced into the mixing nozzle 41 were changed as shown in Table 4. As shown in Table 4, with changes in the amounts of PCMC and PCF as shown in Table 4, the amount of steam (=25 kg/hr) introduced into the mixing nozzle 41 was 1/15 to 1/9 as large as the weight of MC in PCMC introduced into the mixing nozzle 41, and the amount of PCF introduced into the mixing nozzle 41 was 2 to 10% of the weight of PC in PCMC introduced into the mixing nozzle 41.

Table 4 shows the bulk density and residual MC amount of each of the so-obtained PC powders having a high bulk density.

Example 29 (Process III; Combination A with Process I)

A PC powder having a high bulk density was obtained with the apparatus shown in FIG. 5 in the same manner as in Example 23 except that PCMC having a PC concentration of 8 wt % was used and that the amounts of this PCMC and PCF introduced into the mixing nozzle 41 were changed to 203.8 kg/hr and 815 g/hr, respectively, as shown in Table 4. In addition, as shown in Table 4, with changes in the PC concentration, the amount of introduced PCMC and the amount of introduced PCF as shown in Table 4, the amount (=25 kg/hr) of steam introduced into the mixing nozzle 41 was 1/15 as large as the weight of MC in PCMC introduced into the mixing nozzle 41, and the amount of PCF introduced into the mixing nozzle 41 was 5% of the weight of PC in PCMC introduced into the mixing nozzle 41, which values were the same as those in Example 23.

Table 4 shows the bulk density and residual MC amount of the so-obtained PC powder having a high bulk density.

Example 30 (Process III: Combination A with Process I)

A PC powder having a high bulk density was obtained with the apparatus shown in FIG. 5 in the same manner as in Example 23 except that PCMC having a PC concentration of 25 wt % was used and that the amounts of this PCMC and PCF introduced into the mixing nozzle 41 were changed to 250 kg/hr and 3.13 kg/hr, respectively, as shown in Table 4. In addition, as shown in Table 4, with changes in the PC concentration, the amount of introduced PCMC and the amount of introduced PCF as shown in Table 4, the amount (=25 kg/hr) of steam introduced into the mixing nozzle 41 was 1/15 as large as the weight of MC in PCMC introduced into the mixing nozzle 41, and the amount of PCF introduced into the mixing nozzle 41 was 5% of the weight of PC in PCMC introduced into the mixing nozzle 41, which values were the same as those in Example 23.

Table 4 shows the bulk density and residual MC amount off the so-obtained PC powder having a high bulk density.

Examples 31–32 (Process III; Combination A with Conventional Method)

PC powders having a high bulk density were obtained with the apparatus shown in FIG. 5 in the same manner as in Example 23 except that the amounts of PCMC and PCF introduced into the mixing nozzle 41 were changed as shown in Table 4. In addition, as shown in table 4, with changes in the amounts of introduced PCMC and introduced PCF as shown in Table 4, the amount (=25 kg/hr) of steam introduced into the mixing nozzle 41 was ½ as large as the weight of MC in PCMC introduced into the mixing nozzle 41, and the amount of PCF introduced into the mixing nozzle 41 was 5–10% of the weight of PC in PCMC introduced into the mixing nozzle 41.

Table 4 shows the bulk density and residual MC amount of each of the so-obtained PC powders having a high bulk density.

Referential Example 1 (Process I)

A PC powder (one of PC powders having a high bulk density, produced according to Process I) was obtained with the apparatus shown in FIG. 5 in the same manner as in Example 23 except that no PCF was introduced into the mixing nozzle 41 as shown in Table 5.

Table 5 shows the bulk density and residual MC amount of the so-obtained PC powder.

Referential Example 2 (Process I)

A PC powder (one of PC powders having a high bulk density, produced according to Process I) was obtained with the apparatus shown in FIG. 5 in the same manner as in Example 26 except that no PCF was introduced into the mixing nozzle 41 as shown in Table 5.

Table 5 shows the bulk density and residual MC amount of the so-obtained PC powder.

Referential Example 3 (Process I)

A PC powder (one of PC powders having a high bulk density, produced according to Process I) was obtained with the apparatus shown in FIG. 5 in the same manner as in Example 29 except that no PCF was introduced into the mixing nozzle 41 as shown in Table 5.

Table 5 shows the bulk density and residual MC amount of the so-obtained PC powder.

Referential Example 4 (Process I)

A PC powder (one of PC powders having a high bulk density, produced according to Process I) was obtained with the apparatus shown in Fig, 5 in the same manner as in Example 30 except that no PCF was introduced into the mixing nozzle 41 as shown in Table 5.

Table 5 shows the bulk density and residual MC amount of the so-obtained PC powder.

Comparative Example 13 (Conventional method)

A PC powder (one of PC powders produced according to conventional methods) was obtained with the apparatus shown in FIG. 5 in the same manner as in Example 31 except that no PCF was introduced into the mixing nozzle 41 as shown in Table 5.

Table 5 shows the bulk density and residual MC amount of the so-obtained PC powder.

TABLE 4

|  | PC concentration*1 (wt %) | Amount introduced into mixing nozzle (weight per unit hour) PCMC (kg/hr) |  |  | Amount introduced into mixing nozzle |  | PC powder having high bulk density |  |
|---|---|---|---|---|---|---|---|---|
|  |  |  |  |  | Steam*2 |  | Bulk density | Residual MC amount |
|  |  | Total amount | PC | MC | (kg/hr) | PCF*3 | (g/cc) | (wtppm) |
| Example 23 | 13 | 215.5 | 28.0 | 187.5 | 25 [1/7.5] | 1.4 (kg/hr) [5] | 0.61 | 90 |
| Example 24 | 13 | 215.5 | 28.0 | 187.5 | 25 [1/7.5] | 2.8 (kg/hr) [10] | 0.63 | 90 |
| Example 25 | 13 | 215.5 | 28.0 | 187.5 | 25 [1/7.5] | 560 (g/hr) [2] | 0.59 | 90 |
| Example 26 | 13 | 258.6 | 33.6 | 225.0 | 25 [1/9] | 1.68 (kg/hr) [5] | 0.64 | 100 |
| Example 27 | 13 | 258.6 | 33.6 | 225.0 | 25 [1/9] | 3.36 (kg/hr) [10] | 0.66 | 100 |
| Example 28 | 13 | 258.6 | 33.6 | 225.0 | 25 [1/9] | 670 (g/hr) [2] | 0.61 | 100 |
| Example 29 | 8 | 203.8 | 16.3 | 187.5 | 25 [1/7.5] | 815 (g/hr) [5] | 0.61 | 95 |
| Example 30 | 25 | 250 | 62.5 | 187.5 | 25 [1/7.5] | 3.13 (kg/hr) [5] | 0.58 | 90 |
| Example 31 | 13 | 57.5 | 7.5 | 50.0 | 25 [1/2] | 370 (g/hr) [5] | 0.36 | 80 |
| Example 32 | 13 | 57.5 | 7.5 | 50.0 | 25 [1/2] | 740 (g/hr) [10] | 0.38 | 80 |

*1: PC concentration in PCMC
*2: Figure within [ ] shows ratio (unit: times) of steam to weight of MC (weight per unit hour) introduced into mixing nozzle.
*3: Figure within [ ] shows ratio (unit: %) of of PCF to weight of MC (weight per unit hour) introduced into mixing nozzle.

TABLE 5

|  | PC concentration*1 (wt %) | Amount introduced into mixing nozzle (weight per unit hour) PCMC (kg/hr) |  |  | Amount introduced into mixing nozzle |  | PC powder having high bulk density |  |
|---|---|---|---|---|---|---|---|---|
|  |  |  |  |  | Steam*2 |  | Bulk density | Residual MC amount |
|  |  | Total amount | PC | MC | (kg/hr) | PCF*3 | (g/cc) | (wtppm) |
| Ref. Ex. 1 | 13 | 215.5 | 28.0 | 187.5 | 25 [1/7.5] | — | 0.48 | 90 |
| Ref. Ex. 2 | 13 | 258.6 | 33.6 | 225.0 | 25 [1/9] | — | 0.55 | 100 |
| Ref. Ex. 3 | 8 | 203.8 | 16.3 | 187.5 | 25 [1/7.5] | — | 0.50 | 100 |
| Ref. Ex. 4 | 25 | 250 | 62.5 | 187.5 | 25 [1/7.5] | — | 0.47 | 90 |

TABLE 5-continued

| | PC concentration*1 (wt %) | Amount introduced into mixing nozzle (weight per unit hour) PCMC (kg/hr) | | | Amount introduced into mixing nozzle | | PC powder having high bulk density | |
|---|---|---|---|---|---|---|---|---|
| | | | | | Steam*2 | | Bulk | Residual |
| | | | | | | | density | MC amount |
| | | Total amount | PC | MC | (kg/hr) | PCF*3 | (g/cc) | (wtppm) |
| CEx. 13 | 13 | 57.5 | 7.5 | 50.0 | 25 [1/2] | — | 0.25 | 90 |

*1: PC concentration in PCMC.
Ref. Ex. = Referential Example.
CEx. = Comparative Example
*2: Figure within [ ] shows ratio (unit: times) of steam to weight of MC (weight per unit hour) introduced into mixing nozzle.

As is clearly shown in Table 4, the PC powders having a high bulk density, obtained in Examples 23 to 30 wherein Process I was used as a base and PCF was introduced into the mixing nozzle, have a bulk density of 0.58 to 0.66 g/cc. These values are far greater than the bulk density (0.47 to 0.55 g/cc, see Table 5) of the PC powders obtained in Referential Examples 1 to 4 according to Process I. Further, the PC powders having a high bulk density, obtained in Examples 31 and 32 wherein the conventional method was used as a base and PCF was introduced into the mixing nozzle, have a bulk density of 0.36 and 0.38 g/cc. These values are far greater than the bulk density (0.25 g/cc) of the PC powder obtained in Comparative Example 5 which is an example of a conventional method.

Further, in the PC powders having a high bulk density, obtained in Examples 23 to 32, the residual MC amount is as small as 80 to 100 wtppm, and these values are equivalent to, or smaller than, the residual MC amounts of the PC powders obtained in Referential Examples 1 to 4 and Comparative Example 13.

Example 33 (Process IV; Combination B with Process I)

With an apparatus shown in FIG. 6, which had a mixing nozzle 61 into which PCMC and a steam were introduced, a dynamic mixer into which a mixture ejected from this mixing nozzle 61 was introduced through a tubing 70, and a cyclone 73 into which a mixture ejected from this dynamic mixer 71 was introduced through a tubing 72, there was produced a PC powder having a high bulk density in the following manner.

First, TOUGHLON A2500 (trade name) supplied by Idemitsu Petrochemical Co., Ltd. was used as PC. This PC was dissolved in methylene chloride (MC) [special grade, supplied by Hiroshima Wako Pure Chemical Industries, Ltd.] to prepare PCMC having a PC concentration of 13 wt %.

Then, the above PCMC and a steam having a pressure of 14 kg/cm² and a temperature of 195° C. were introduced into the mixing nozzle 61 with a diaphragm pump at rates (feed rates) of 215.5 kg/hr and 25 kg/hr, respectively. In this case, the amount (weight per unit hour, having the same meaning hereinafter) of steam introduced into the mixing nozzle 61 was 1/7.5 as large as the weight (weight per unit hour, having the same meaning hereinafter) of MC in PCMC introduced into the mixing nozzle 61.

As the mixing nozzle 61, there was used a mixing nozzle having the same form and the same size as those of the mixing nozzle shown in FIG. 1.

The mixture ejected from the mixing nozzle 61 was introduced into the dynamic mixer 71 through the tubing 70 having an inner diameter, D, of 10 mm. As the dynamic mixer 71, there was used a dynamic mixer (trade name: T. K. pipeline homomixer SL model, internal volume 50 cc, four turbine blades, diameter of flour turbines 4 cm) supplied by Tokushu Kika Kogyo Co., Ltd., and when it was used, the blade top velocity was set at about 754 m/minute (6,000 rpm).

The mixture ejected from the dynamic mixer 71 was introduced into the cyclone 73 having an internal volume of 0.3 m³ through the stainless steel tubing 72 having an inner diameter of 10 mm. The PC powder was separated (recovered) with this cyclone 73, and MC and the steam were recovered by condensing them with a condenser 74.

in addition, in this Example 33, the flow path length 1 from the mixing nozzle 61 to the dynamic mixer 71 was 0.5 m, the flow path length L from the mixing nozzle 61 to the gas-solid separator (cyclone 73) was 10 m, and L/1 was 20.

Figure 6:
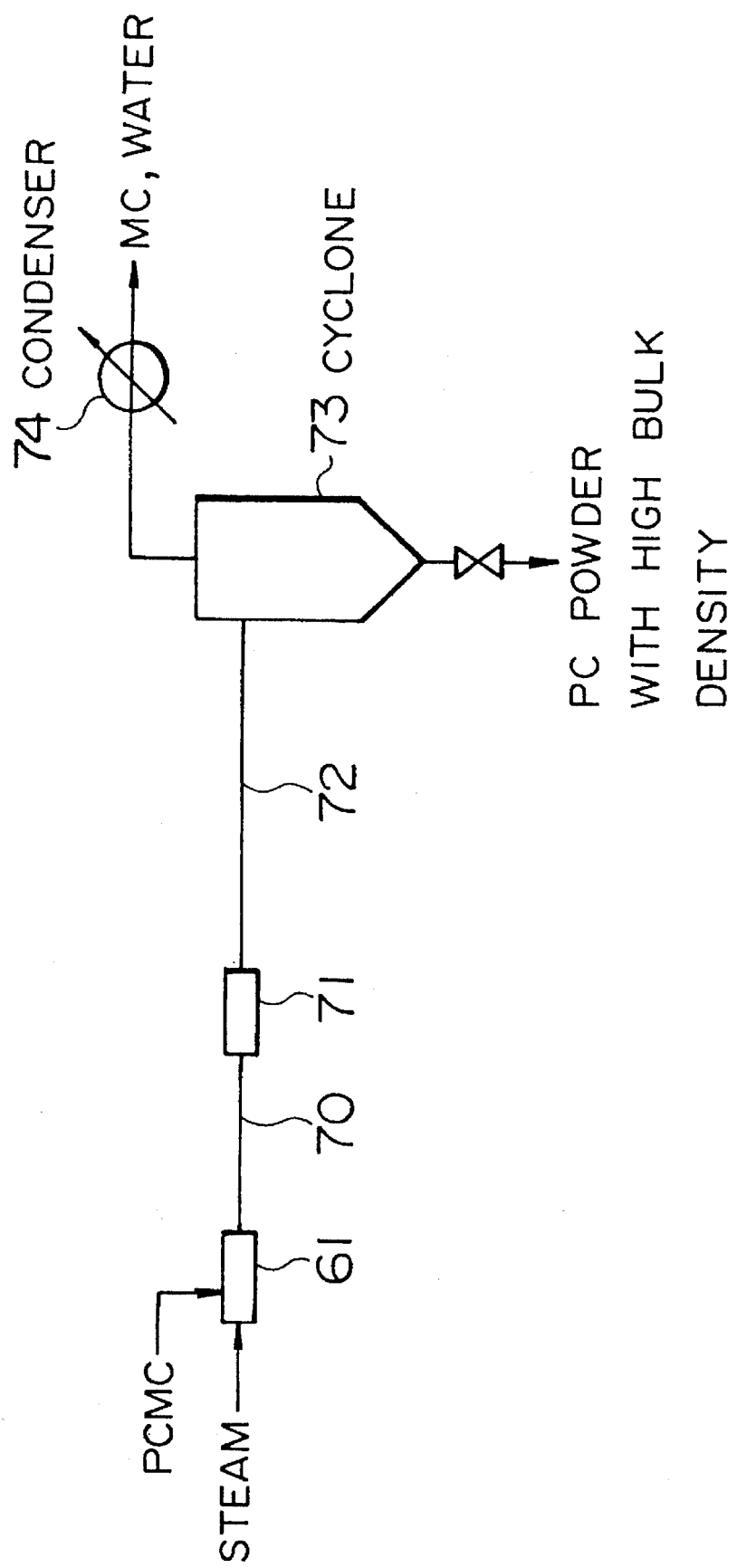
FIG. 6 is a schematic view of an apparatus used for obtaining a polycarbonate powder having a high bulk density in Examples 33 to 40.

After the apparatus shown in FIG. 6 was operated For 1 hour, the intended PC powder having a high bulk density was obtained from the bottom off the cyclone 73. Table 6 shows the bulk density and residual MC amount of the so-obtained PC powder having a high bulk density.

Example 34 (Process IV; Combination B with Process I)

A PC powder having a high bulk density was obtained with the apparatus shown in FIG. 6 in the same manner as in Example 33 except that the amount of PCMC introduced into the mixing nozzle 61 was changed 258.6 kg/hr. As shown in Table 6, with a change in the amount of introduced PCMC, the amount of steam (=25 kg/hr) introduced into the mixing nozzle 61 was 1/9 as large as the weight of MC in PCMC introduced into the mixing nozzle 61.

Table 6 shows the bulk density and residual MC amount of the so-obtained PC powder having a high bulk density.

Example 35 (Process IV; Combination B with Process I)

A PC powder having a high bulk density was obtained with the apparatus shown in FIG. 6 in the same manner as in Example 33 except that PCMC having a PC concentration of 8 wt % and that the amount of this PCMC introduced into the mixing nozzle 61 was changed 203.8 kg/hr. As shown in Table 6, the amount of steam (=25 kg/hr) introduced into the mixing nozzle 61 was 1/7.5 as large as the weight of MC in PCMC introduced into the mixing nozzle 61, and this value was the same as that in Example 33.

Table 6 shows the bulk density and residual MC amount of the so-obtained PC powder having a high bulk density.

Example 36 (Process IV; Combination B with Process I)

A PC powder having a high bulk density was obtained with the apparatus shown in FIG. 6 in the same manner as in Example 33 except that PCMC having a PC concentration of 25 wt % and that the amount of this PCMC introduced into the mixing nozzle 61 was changed 250 kg/hr. As shown in Table 6, the amount of steam (=25 kg/hr) introduced into the mixing nozzle 61 was 1/7.5 as large as the weight of MC in PCMC introduced into the mixing nozzle 61, and this value was the same as that in Example 33.

Table 6 shows the bulk density and residual MC amount of the so-obtained PC powder having a high bulk density.

Example 37 (Process IV: Combination B with Process I)

A PC powder having a high bulk density was obtained with the apparatus shown in FIG. 6 in the same manner as in Example 33 except that the blade too velocity was set at about 1,130 m/minute (9,000 rpm) when the dynamic mixer 71 was used.

Table 6 shows the bulk density and residual MC amount of the so-obtained PC powder having a high bulk density.

Example 38 (Process IV; Combination B with Process I)

A PC powder having a high bulk density was obtained with the apparatus shown in FIG. 6 in the same manner as in Example 33 except that the blade top velocity was set at about 126 m/minute (1.000 rpm) when the dynamic mixer 71 was used.

Table 6 shows the bulk density and residual MC amount of the so-obtained PC powder having a high bulk density.

Example 39 (Process IV; Combination B with Process I)

A PC powder having a high bulk density was obtained in the same manner as in Example 33 except that the dynamic mixer 71 was replaced with a static mixer, a Sulzer static mixer (mixing elements and number thereof: SMV type supplied by Sumitomo Heavy Industries, Ltd., 10 elements). In this case, The flow path length 1 from the mixing nozzle 61 to the static mixer was 0.5 m, the flow path length L from the mixing nozzle 61 to the cyclone 73 was 10 m, and L/1 was 20.

Table 6 shows the bulk density and residual. MC amount of the so-obtained PC powder having a high bulk density.

Example 40 (Process IV; Combination B with Process I)

A PC powder having a high bulk density was obtained with the apparatus shown in FIG. 6 in the same manner as in Example 33 except that the amount of PCMC introduced into the mixing nozzle 61 was changed 57.5 kg/hr. As shown in Table 6, with a change in the amount of introduced PCMC, the amount of steam (=25 kg/hr) introduced into the mixing nozzle 61 was ½ as large as the weight of MC in PCMC introduced into the mixing nozzle 61.

Table 6 shows the bulk density and residual MC amount of the so-obtained PC powder having a high bulk density.

Referential Examples 5–8 (Process I)

A PC powder (one of PC powders having a high bulk density, produced according to Process I) was obtained with an apparatus similar to the apparatus shown in FIG. 6 in the same manner as in Example 33, 34, 35 or 36 except that no dynamic mixer 71 was used and that the mixing nozzle 61 and the cyclone 73 were directly connected through a stainless steel tubing having an inner diameter of 10 mm and a length of 10 m.

Table 6 shows the bulk density and residual MC amount of each of the above-obtained PC powders.

Comparative Example 14 (Conventional Method)

A PC powder (one of PC powders produced according to conventional methods) was obtained with an apparatus similar to the apparatus shown in FIG. 6 in the same manner as in Example 40 except that no dynamic mixer 71 was used and that the mixing nozzle 61 and the cyclone 73 were directly connected through a stainless steel tubing having an inner diameter of 10 mm and a length of 10 m.

Table 6 shows the bulk density and residual MC amount of each of the above-obtained PC powders.

TABLE 6

| | PC concentration*1 (wt %) | Amount Introduced into Mixing Nozzle | | | | Mixer | | PC Powder | |
| | | PCMC (kg/hr) | | | Steam*2 | | Blade top velocity | Bulk density | Residual MC amount |
| | | Total amount | PC | MC | (kg/hr) | kind | (m/minute) | (g/cc) | (wtppm) |
| Ex. 33 | 13 | 215.5 | 28.0 | 187.5 | 25 [1/7.5] | dynamic | 754 | 0.60 | 90 |
| Ex. 34 | 13 | 258.6 | 33.6 | 225.0 | 25 [1/9] | dynamic | 754 | 0.65 | 100 |
| Ex. 35 | 8 | 203.8 | 16.3 | 187.5 | 25 [1/7.5] | dynamic | 754 | 0.66 | 100 |
| Ex. 36 | 25 | 250 | 62.5 | 187.5 | 25 [1/7.5] | dynamic | 754 | 0.59 | 90 |
| Ex. 37 | 13 | 215.5 | 28.0 | 187.5 | 25 [1/7.5] | dynamic | 1,130 | 0.63 | 90 |
| Ex. 38 | 13 | 215.5 | 28.0 | 187.5 | 25 [1/7.5] | dynamic | 125 | 0.58 | 90 |
| Ex. 39 | 13 | 215.5 | 28.0 | 187.5 | 25 [1/7.5] | static | — | 0.53 | 90 |
| Ex. 40 | 13 | 57.5 | 7.5 | 50.0 | 25 [1/2] | dynamic | 754 | 0.37 | 90 |
| REx. 5 | 13 | 215.5 | 28.0 | 187.5 | 25 [1./7.5] | not used | — | 0.48 | 90 |
| REx. 6 | 13 | 258.6 | 33.6 | 225.0 | 25 [1/9] | not used | — | 0.55 | 100 |
| REx. 7 | 8 | 203.8 | 16.3 | 187.5 | 25 [1/7.5] | not used | — | 0.50 | 100 |
| REx. 8 | 25 | 250 | 62.5 | 187.5 | 25 | not used | — | 0.47 | 90 |

TABLE 6-continued

| | PC concentration*1 (wt %) | Amount Introduced into Mixing Nozzle | | | | | Mixer | | PC Powder | |
| | | PCMC (kg/hr) | | | Steam*2 | | Blade top velocity | Bulk density | Residual MC amount | |
| | | Total amount | PC | MC | (kg/hr) | kind | (m/minute) | (g/cc) | (wtppm) | |
|---|---|---|---|---|---|---|---|---|---|---|
| CEx. 14 | 13 | 57.5 | 7.5 | 50.0 | [1/7.5] 25 [1/2] | not used | — | 0.25 | 90 | |

Ex. = Example, REx. = Referential Example
CEx. = Comparative Example
*1: PC concentration in PCMC
*2: Figure within [ ] shows ratio (unit: times) of steam introduced into mixing nozzle to weight of MC introduced into mixing nozzle.

As is clearly shown in Table 6, the PC powders having a high bulk density, obtained in Examples 33 to 39 wherein Process I was used as a base and the mixer was used in combination, have a bulk density of 0.53 to 0.65 g/cc. These values are greater than the bulk density values (0.47–0.55 g/cc, see Table 6) of the PC powders obtained in Referential Examples 5 to 8 which are examples of Process I. Further, the PC powder having a high bulk density, obtained in Example 40 wherein a conventional method was used as a base and the mixer was used in combination, has a bulk density of 0.37 g/cc. This value is far greater than the bulk density (0.25 g/cc) of the PC powder obtained in Comparative Example 14 which is an example of a conventional method.

Further, in the PC powders having a high bulk density, obtained in Examples 33 to 40, the residual MC amounts are as low as 90 to 100 wtppm, and these values are substantially equivalent to the residual MC amounts (90– 100 wtppm) of the PC powders obtained in Referential Examples 5 to 8 and Comparative Example 14.

As explained above, any one of Processes I to IV can facilely give a polycarbonate powder having a higher bulk density than any conventional polycarbonate powder without increasing the residual solvent amount.

And, the polycarbonate powder having a high bulk density, obtained by any one of these Processes, can increase the volume efficiency off apparatus used for post treatments such as drying or storage and can be easily molded into dense pellets.

Therefore, the productivity of a high-quality polycarbonate product can be improved by working the present invention.

According to Process II, further, a polycarbonate powder of which the bulk density is high and the residual solvent amount is small can be facilely obtained, and the change of properties of the polycarbonate powder is small even if the amount of the organic solvent solution of polycarbonate for treatment varies. Therefore, the polycarbonate powder obtained by Process II can not only improve the volume efficiency of apparatus for carrying out post treatments such as drying, storage, granulation and molding, but also can be stably subjected to post treatments. From this point of view, the productivity of a polycarbonate product can be also improved.

What is claimed is:

1. A process for the production of a polycarbonate powder having a high bulk density, comprising introducing (i) an organic solvent solution containing an organic solvent and a polycarbonate and (ii) steam into a mixing nozzle and recovering the polycarbonate as a powder from a mixture ejected from the mixing nozzle, the organic solvent solution containing 3 to 45% by weight of the polycarbonate, and a ratio of a weight of steam ($W_s$)/ a weight of the organic solvent in the organic solvent solution ($W_o$) being 1/10 to 1/3.

2. The process of claim 1, wherein the $W_s/W_o$ is 1/8–1/6.

3. The process of claim 1, wherein the organic solvent is methylene chloride.

4. The process of claim 1, wherein the organic solvent solution of the polycarbonate is obtained during producing the polycarbonate by an interfacial polycondensation reaction.

5. The process of claim 1, wherein the steam is at a pressure of 1 to 100 kg/cm$^2$ and a temperature of 100° to 310° C.

6. The process of claim 1, wherein the mixture ejected from the mixing nozzle is introduced into a gas-solid separator through a conduit having an inner diameter, D, of 5 mm to 25 cm, a length, L, of 50 cm to 1,000 m and a ratio of the length to the diameter (L/D) of 100 to 10,000, and the polycarbonate powder is separated by the gas-solid separator.

7. A process for the production of a polycarbonate powder having a high bulk density, which comprises introducing an organic solvent solution having a polycarbonate concentration of 3 to 45% by weight and steam in an amount of 1/20 to 1/8 of the weight of an organic solvent in the organic solvent solution, into a mixing nozzle;

mixing a mixture ejected from the mixing nozzle with steam in an amount of 1/200 to 1/1 of the weight of the organic solvent in the organic solvent solution, after a residence time of 0.001 to 1 second, to obtain a second mixture; and recovering a polycarbonate as a powder from the second mixture.

8. The process of claim 7, wherein the mixture ejected from the mixing nozzle is introduced into a second mixing nozzle through a tubing, and the steam is introduced into the second mixing nozzle, to obtain the second mixture.

9. The process of claim 7, wherein the organic solvent is methylene chloride.

10. The process of claim 7, wherein the organic solvent solution of the polycarbonate is obtained during producing the polycarbonate by an interfacial polycondensation reaction.

11. The process of claim 7, wherein the steam is at a pressure of 1 to 100 kg/cm$^2$.

12. A process for the production of a polycarbonate having a high bulk density, which comprises introducing (i) an organic solvent solution containing an organic solvent and a first polycarbonate in a concentration of 3 to 45% by weight, (ii) steam and (iii) a second polycarbonate powder into a mixing nozzle; and recovering a resultant polycarbonate as a powder from a mixture ejected from the mixing nozzle.

13. The process of claim 12, wherein, for introducing the organic solvent solution, the steam and the polycarbonate powder into the mixing nozzle, the steam and the polycarbonate powder are introduced into the mixing nozzle after being brought into a mixed state.

14. The process of claim 12, wherein an amount of the steam introduced into the mixing nozzle is $1/10$ to $1/1$ of a weight of the organic solvent in the organic solvent solution introduced into the mixing nozzle and an amount of the polycarbonate powder introduced into the mixing nozzle is 0.5 to 20% of the weight of the first polycarbonate in the organic solvent solution introduced into the mixing nozzle.

15. The process of claim 12, wherein the first polycarbonate powder has a particle diameter of 8 mesh or less and the second polycarbonate powder has a particle diameter of 200 mesh or more.

16. The process of claim 12, wherein the organic solvent is methylene chloride.

17. The process of claim 12, wherein the organic solvent solution of the first polycarbonate is obtained during producing the first polycarbonate by an interfacial polycondensation reaction.

18. The process of claim 12, wherein the steam is at a pressure of 1 to 100 kg/cm$^2$ and a temperature of 100° to 310° C.

19. The process of claim 12, wherein the mixture ejected from the mixing nozzle is introduced into a gas-solid separator through a conduit having an inner diameter, D, of 5 mm to 25 cm, a length, L, of 50 cm to 1,000 m and a ratio of the length to the diameter (L/D) of 100 to 10,000, and the resultant polycarbonate powder is separated by the gas-solid separator.

20. A process for the production of a polycarbonate having a high bulk density, which comprises introducing (i) an organic solvent solution containing an organic solvent and a polycarbonate in a concentration of 3 to 45% by weight and (ii) steam into a mixing nozzle;

introducing a mixture ejected from the mixing nozzle, into a mixer directly from the mixing nozzle or through a conduit;

introducing a mixture from the mixer, into a gas-solid separator through a conduit; and recovering the polycarbonate by the gas-solid separator.

21. The process of claim 20, wherein the mixer is disposed to satisfy that a ratio (L/1*) of a flow path length (L) from the mixing nozzle to the gas-solid separator to a flow path length (1*) from the mixing nozzle to the mixer of at least 5.

22. The process of claim 20, wherein the mixer is a dynamic mixer having a blade top velocity of 50 to 2,500 m/minute.

23. The process of claim 20, wherein the organic solvent is methylene chloride.

24. The process of claim 20, wherein the organic solvent solution of the polycarbonate is obtained during producing the polycarbonate by an interfacial polycondensation reaction.

25. The process of claim 20, wherein the steam is at a pressure of 1 to 100 kg/cm$^2$ and a temperature of 100° to 310° C.

26. The process of claim 20, wherein an amount of the steam introduced into the mixing nozzle is $1/10$ to $1/1$ of a weight of the organic solvent in the organic solvent solution introduced into the mixing nozzle.

27. The process of claim 20, wherein the mixing nozzle and the mixer are connected by a first conduit, and the mixer and the gas-solid separator are connected by a second conduit, each of the first conduit and the second conduit having an inner diameter, D, of 5 mm to 25 cm, a length, L, of 50 cm to 1,000 m and a ratio (L/D) of the length to the diameter being 100 to 10,000.

28. The process of claim 12, wherein the second polycarbonate powder is in an amount of 0.5 to 20% by weight based on the weight of the first polycarbonate.

29. The process of claim 12, wherein the second polycarbonate powder is in an amount of 1 to 20% by weight based on the weight of the first polycarbonate.

30. The process of claim 20, wherein the polycarbonate is in a concentration of 10 to 30% by weight.

* * * * *

UNITED STATES PATENT AND TRADEMARK OFFICE
CERTIFICATE OF CORRECTION

PATENT NO. : 5,475,084
DATED      : December 12, 1995
INVENTOR(S): OKAMOTO et al It is certified that error appears in the above-indentified patent and that said Letters Patent is hereby corrected as shown below:

```
On the Title Page, Left Column, [21]:  After "Appln.
No.", replace "327,027" with --237,027--.

Column 28, line 51 (Claim 7):   before mixture insert
--first--.

Column 29, (Claim 15): line 23, before "polycar-",
delete "first" and insert --second--.
                      line 24, delete "less" and
insert --smaller--.
                      lines 24 and 25, delete "and the
second polycarbonate powder has a particle diameter
of".
                      line 26, before "200" insert
--, but--.
                      line 26, delete "more" and
insert --larger--.
```

Signed and Sealed this

Twenty-eighth Day of July, 1998

Attest:

*Attesting Officer*

BRUCE LEHMAN
*Commissioner of Patents and Trademarks*